(12) United States Patent
Brumm et al.

(10) Patent No.: US 11,084,622 B2
(45) Date of Patent: Aug. 10, 2021

(54) STRUCTURE FOR AUTOMATED PALLET STORAGE AND RETRIEVAL

(71) Applicant: Swisslog Logistics, Inc., Newport News, VA (US)

(72) Inventors: Christopher Brumm, Ripon, CA (US); Rodney Tipton, Acampo, CA (US); Mohan Ramankutty, Mountain House, CA (US); Pat Mitchell, Lathrop, CA (US)

(73) Assignee: Swisslog Logistics, Inc., Newport News, VA (US)

( * ) Notice: Subject to any disclaimer, the term of this patent is extended or adjusted under 35 U.S.C. 154(b) by 882 days.

(21) Appl. No.: 15/534,913

(22) PCT Filed: Nov. 16, 2015

(86) PCT No.: PCT/US2015/060905
§ 371 (c)(1),
(2) Date: Jun. 9, 2017

(87) PCT Pub. No.: WO2016/094039
PCT Pub. Date: Jun. 16, 2016

(65) Prior Publication Data
US 2018/0265290 A1 Sep. 20, 2018

Related U.S. Application Data

(60) Provisional application No. 62/089,738, filed on Dec. 9, 2014.

(51) Int. Cl.
*B65D 19/00* (2006.01)
*B65G 1/02* (2006.01)
*A47B 47/00* (2006.01)

(52) U.S. Cl.
CPC .......... *B65D 19/0004* (2013.01); *B65G 1/02* (2013.01); *A47B 47/00* (2013.01)

(58) Field of Classification Search
CPC ... B65G 1/14; B65G 1/00; B65G 1/02; B65G 1/0492; B65G 1/065; B65G 1/0414;
(Continued)

(56) References Cited

U.S. PATENT DOCUMENTS 1,504,523 A * 8/1924 Sherer .................... A47B 57/30
108/102
1,829,009 A * 10/1931 Madsen ............... A47B 57/485
248/243

(Continued)

FOREIGN PATENT DOCUMENTS

EP 0197448 B1 10/1988

OTHER PUBLICATIONS

International Search Report and Written Opinion dated Mar. 11, 2016 for PCT/US0215/060905.

*Primary Examiner* — Jonathan Liu
*Assistant Examiner* — Devin K Barnett
(74) *Attorney, Agent, or Firm* — Bachman & LaPointe, P.C.

(57) ABSTRACT

A multi-level rail for a storage structure may comprise an upper horizontal portion configured to support a load and a lower horizontal portion configured to support a row vehicle. An upper support portion extends downward diagonally from the upper horizontal portion toward the lower horizontal portion, and a lower support extends downward diagonally from the lower horizontal portion. This rail is configured to connect to at least one vertical post of the storage structure. Support beams for a railed storage structure are also disclosed with an elongated body having a terminal end portion configured to attach to a vertical
(Continued)

column of a storage support structure and an upper support surface configured to support a horizontal support rail. A wing portion is secured to the terminal end portion and configured to attach to the horizontal support rail by extending lateral to the elongated body and above the upper support surface.

16 Claims, 10 Drawing Sheets

(58) Field of Classification Search
CPC .. B65G 1/0457; B65G 1/0471; B65D 19/004; A47B 47/00
USPC ............ 211/191, 192, 208, 183, 182, 94.01; 248/250, 200.1; 414/749.6, 267; 256/59
See application file for complete search history.

(56) References Cited

U.S. PATENT DOCUMENTS

| | | | | |
|---|---|---|---|---|
| 1,852,598 A | * | 4/1932 | Vogt | A47B 57/425 248/243 |
| 1,853,018 A | * | 4/1932 | Knape | A47B 57/425 248/243 |
| 2,471,839 A | * | 5/1949 | Schumacher | H01B 17/24 248/222.13 |
| 2,577,276 A | * | 12/1951 | Saul, Jr. | A47B 47/028 108/110 |
| 2,673,700 A | * | 3/1954 | Eberhardt | B65D 19/385 108/53.5 |
| 2,686,646 A | * | 8/1954 | McMillan | B65D 19/16 108/55.1 |
| 2,815,130 A | * | 12/1957 | Franks | A47B 57/402 211/191 |
| 2,905,445 A | * | 9/1959 | Blum | E04F 11/181 256/65.03 |
| 2,926,792 A | * | 3/1960 | Seiz | B65D 19/16 108/53.5 |
| 2,953,340 A | * | 9/1960 | Skubic | B65D 19/385 108/53.5 |
| 3,017,151 A | * | 1/1962 | Townson, Jr. | B65D 19/385 108/53.5 |
| 3,018,862 A | * | 1/1962 | Litteral | A47B 47/021 52/690 |
| 3,042,221 A | * | 7/1962 | Rasmussen | A47B 57/50 211/183 |
| 3,054,511 A | * | 9/1962 | Erismann | A47B 57/485 211/208 |
| 3,123,021 A | * | 3/1964 | Evans | B65D 19/385 108/53.5 |
| 3,124,402 A | * | 3/1964 | Rhoads | A47B 88/483 312/350 |
| 3,128,851 A | * | 4/1964 | Deridder | E04C 2/08 52/588.1 |
| 3,199,683 A | * | 8/1965 | Graswich | A47B 57/425 211/41.1 |
| 3,216,678 A | * | 11/1965 | Foedisch | G01M 11/04 248/694 |
| 3,229,790 A | * | 1/1966 | Shayne | F16B 12/50 403/172 |
| 3,273,720 A | * | 9/1966 | Seiz | A47B 57/402 211/192 |
| 3,285,428 A | * | 11/1966 | Scheck | A47B 57/06 211/191 |
| 3,456,966 A | * | 7/1969 | Hermann | E04B 1/5831 403/7 |
| 3,463,325 A | * | 8/1969 | Rogers | F16B 12/32 211/191 |
| 3,476,260 A | * | 11/1969 | Jay | B65G 1/14 206/503 |
| 3,545,626 A | * | 12/1970 | Seiz | A47B 57/487 211/192 |
| 3,587,867 A | * | 6/1971 | Fenwick | A47F 5/103 211/183 |
| 3,655,063 A | * | 4/1972 | Landry | A47B 57/50 211/41.2 |
| 3,698,782 A | * | 10/1972 | Onori | A47B 31/00 312/350 |
| 3,701,442 A | * | 10/1972 | Dunning | B65G 1/0421 414/273 |
| 3,746,189 A | * | 7/1973 | Burch | B65G 1/0428 414/273 |
| 3,785,502 A | * | 1/1974 | Konstant | B65G 1/02 211/134 |
| 3,800,963 A | * | 4/1974 | Holland | B65G 1/0414 414/279 |
| 3,802,574 A | * | 4/1974 | Weider | A47B 47/027 211/134 |
| 3,848,755 A | * | 11/1974 | Bussienne | B65G 1/0414 414/279 |
| 3,862,691 A | * | 1/1975 | Mori | A47B 57/40 211/191 |
| 3,881,429 A | * | 5/1975 | Seymore | B65D 19/20 108/51.3 |
| 4,078,664 A | * | 3/1978 | McConnell | A47B 96/00 108/159 |
| 4,286,911 A | * | 9/1981 | Benjamin | B65G 1/0414 191/1 R |
| 4,342,397 A | * | 8/1982 | Halstrick | A47B 57/402 211/182 |
| 4,607,753 A | * | 8/1986 | Radek | A47F 5/0846 211/189 |
| 4,631,891 A | * | 12/1986 | Donavich | B62D 25/2054 105/375 |
| 4,674,240 A | * | 6/1987 | Strausheim | A47F 5/0846 211/189 |
| 4,678,091 A | * | 7/1987 | Konstant | A47B 57/44 211/182 |
| 4,687,404 A | * | 8/1987 | Seiz | B65G 1/06 414/276 |
| 4,694,965 A | * | 9/1987 | Parnell | A47F 5/0846 211/189 |
| 4,752,058 A | * | 6/1988 | Weber | B61D 45/008 248/615 |
| 4,809,479 A | * | 3/1989 | Tierno | A47F 5/0846 211/189 |
| 4,815,613 A | * | 3/1989 | Hollander | A47B 57/44 211/191 |
| 4,825,601 A | * | 5/1989 | Halverson | A47F 5/0846 211/189 |
| 4,915,240 A | * | 4/1990 | Konstant | B65G 1/026 211/151 |
| 4,955,490 A | * | 9/1990 | Schafer | A47B 57/581 211/187 |
| 4,981,225 A | * | 1/1991 | Cole | B65G 1/02 211/180 |
| 4,995,682 A | | 2/1991 | Gutner | |
| 5,012,938 A | * | 5/1991 | King | A47B 47/027 211/182 |
| 5,147,176 A | * | 9/1992 | Stolzer | B65G 1/0442 198/346.1 |
| 5,170,605 A | * | 12/1992 | Huddle | B60P 3/20 52/588.1 |
| 5,195,713 A | * | 3/1993 | Van Dore | A47B 97/04 248/222.11 |
| 5,228,579 A | * | 7/1993 | Kaufman | A47F 5/0846 211/94.01 |
| 5,240,213 A | * | 8/1993 | Horcher | E01B 25/24 16/94 R |
| 5,279,431 A | * | 1/1994 | Highsmith | B65G 1/02 211/187 |
| 5,329,861 A | * | 7/1994 | McCarthy | B65D 19/0026 108/51.3 |
| 5,419,264 A | * | 5/1995 | Davis | A47B 77/06 108/27 |
| 5,419,444 A | * | 5/1995 | Strom | B65G 1/026 211/151 |

(56) References Cited

U.S. PATENT DOCUMENTS

| | | | | |
|---|---|---|---|---|
| 5,476,180 A * | 12/1995 | Konstant | B65G 1/06 | 211/151 |
| 5,538,384 A * | 7/1996 | Haldimann | B65G 1/06 | 193/35 A |
| 5,628,415 A * | 5/1997 | Mulholland | A47B 47/027 | 211/186 |
| 5,791,093 A * | 8/1998 | Diamond | E04F 13/12 | 52/36.5 |
| 5,806,820 A * | 9/1998 | Simon | F16L 3/2431 | 248/243 |
| 5,813,649 A * | 9/1998 | Peterson | B60N 2/42709 | 248/300 |
| 5,845,795 A * | 12/1998 | Mulholland | A47B 47/027 | 211/192 |
| D408,558 S * | 4/1999 | Levy | D25/119 | |
| 5,927,041 A * | 7/1999 | Sedlmeier | E04B 9/064 | 248/49 |
| 5,967,728 A * | 10/1999 | Gales | B65G 1/0478 | 211/151 |
| 6,041,719 A * | 3/2000 | Vidal | B65D 19/0002 | 108/51.3 |
| 6,068,084 A * | 5/2000 | Taormina | E04G 21/32 | 182/113 |
| 6,082,810 A * | 7/2000 | Bennett | B62D 25/2054 | 296/184.1 |
| 6,131,521 A * | 10/2000 | Nelson | A47B 77/022 | 108/27 |
| 6,134,846 A * | 10/2000 | Lamb | A47F 5/0846 | 211/94.01 |
| 6,135,030 A * | 10/2000 | Besaw | B65D 19/0012 | 108/51.3 |
| 6,149,366 A * | 11/2000 | Deandrea | B65G 1/0414 | 414/279 |
| 6,164,467 A * | 12/2000 | DePottey | A47F 5/0846 | 211/189 |
| 6,260,719 B1 * | 7/2001 | Azzopardi | B65G 1/02 | 211/189 |
| 6,269,906 B1 * | 8/2001 | Dockter | B60R 3/007 | 182/92 |
| 6,325,223 B1 * | 12/2001 | Hannen | A47F 5/0846 | 211/87.01 |
| 6,602,032 B2 * | 8/2003 | Arai | B65D 19/385 | 108/55.1 |
| D482,803 S * | 11/2003 | Yates, Jr. | D25/121 | |
| 6,811,043 B2 * | 11/2004 | Perkins | A47B 21/06 | 211/94.01 |
| 6,925,943 B2 * | 8/2005 | Salmanson | A47B 57/22 | 108/107 |
| 7,228,977 B2 * | 6/2007 | Perkins | A47B 83/001 | 211/87.01 |
| 7,491,024 B2 * | 2/2009 | Heinrichs | B65D 19/12 | 108/53.1 |
| 7,686,559 B2 * | 3/2010 | Tsujimoto | B65G 1/0407 | 414/273 |
| 7,784,407 B2 * | 8/2010 | Di Rosa | B65G 1/0414 | 104/48 |
| 7,856,784 B2 * | 12/2010 | Martensson | E04B 1/6129 | 52/582.1 |
| 8,033,404 B2 * | 10/2011 | Keller | A47F 5/0846 | 211/94.01 |
| 8,267,363 B2 * | 9/2012 | Begic | A47B 96/067 | 211/4 |
| 8,376,299 B2 * | 2/2013 | Burkman | A47G 1/16 | 108/42 |
| 8,651,294 B2 * | 2/2014 | Mansor | A47B 43/003 | 108/42 |
| 8,656,843 B2 * | 2/2014 | Monteith | B65D 19/0026 | 108/51.3 |
| 8,721,250 B2 * | 5/2014 | Razumov | B65G 1/0492 | 414/281 |
| 9,027,767 B2 * | 5/2015 | Buckley | A47F 5/00 | 211/134 |
| 9,133,979 B2 * | 9/2015 | Dewaele | F16M 13/02 | |
| 9,334,114 B2 * | 5/2016 | Salichs | B65G 1/0492 | |
| 9,499,339 B2 * | 11/2016 | Roberto | B65G 1/0414 | |
| 9,596,948 B1 * | 3/2017 | McGinnis | A47F 5/00 | |
| 9,713,379 B1 * | 7/2017 | Tsai | A47B 96/06 | |
| 9,976,311 B2 * | 5/2018 | Gulnick | E04F 13/0803 | |
| 10,207,867 B2 * | 2/2019 | Brumm | B60L 5/40 | |
| 10,299,594 B2 * | 5/2019 | Liss | A47B 47/027 | |
| 10,492,631 B2 * | 12/2019 | Velderman | H05K 7/183 | |
| 2002/0043508 A1 * | 4/2002 | Lewis | A47B 57/44 | 211/26 |
| 2002/0139766 A1 * | 10/2002 | Courtwright | B65G 1/026 | 211/191 |
| 2002/0153341 A1 * | 10/2002 | May | A47B 57/408 | 211/192 |
| 2002/0185580 A1 * | 12/2002 | Giasi | B65D 19/20 | 248/346.4 |
| 2004/0031889 A1 * | 2/2004 | Magnusson | A47B 96/061 | 248/200.1 |
| 2004/0155003 A1 * | 8/2004 | Anderson | A47B 47/021 | 211/191 |
| 2004/0238702 A1 * | 12/2004 | Britten | A47B 96/06 | 248/227.1 |
| 2005/0000928 A1 * | 1/2005 | Calleja | F16P 1/02 | 211/183 |
| 2005/0103734 A1 * | 5/2005 | Saltzberg | A47B 96/1441 | 211/187 |
| 2005/0191156 A1 | 9/2005 | Melin | | |
| 2005/0247653 A1 * | 11/2005 | Brooks | B25H 3/04 | 211/94.01 |
| 2006/0091094 A1 * | 5/2006 | Schuberth | A47F 5/0846 | 211/94.01 |
| 2006/0180561 A1 * | 8/2006 | Wisnoski | A47F 5/0846 | 211/94.01 |
| 2006/0266901 A1 * | 11/2006 | Tallman | A47F 5/0846 | 248/220.43 |
| 2006/0288913 A1 * | 12/2006 | Lo | B65D 19/0038 | 108/51.3 |
| 2007/0012636 A1 * | 1/2007 | Wisnoski | A47F 5/0846 | 211/70.6 |
| 2007/0221594 A1 * | 9/2007 | Pierro | A47F 5/0846 | 211/94.01 |
| 2007/0256996 A1 * | 11/2007 | Jackle | A47F 5/0846 | 211/94.01 |
| 2008/0000862 A1 * | 1/2008 | Lawson | A47B 96/14 | 211/94.01 |
| 2008/0295452 A1 * | 12/2008 | Birnbaum | E04C 3/065 | 52/832 |
| 2009/0014401 A1 * | 1/2009 | Tallman | A47F 5/0846 | 211/106.01 |
| 2009/0223421 A1 * | 9/2009 | Ferguson | B65D 19/0016 | 108/51.3 |
| 2009/0308289 A1 * | 12/2009 | Ferguson | B65D 19/0016 | 108/51.3 |
| 2010/0084354 A1 * | 4/2010 | Eustace | A47B 96/1441 | 211/134 |
| 2010/0155354 A1 * | 6/2010 | Krueger | A47B 96/068 | 211/183 |
| 2010/0181274 A1 * | 7/2010 | Vargo | A47B 57/50 | 211/187 |
| 2011/0255940 A1 * | 10/2011 | Wildfeuer | B65G 1/04 | 414/267 |
| 2012/0000399 A1 * | 1/2012 | Aden | B65D 19/0026 | 108/51.11 |
| 2012/0000871 A1 * | 1/2012 | Troyner | A47B 96/02 | 211/134 |
| 2012/0003039 A1 * | 1/2012 | Wallace | E01F 15/088 | 404/6 |
| 2013/0129453 A1 * | 5/2013 | Salichs | B65G 1/0492 | 414/277 |
| 2015/0183587 A1 * | 7/2015 | Toth | B65G 15/64 | 198/604 |
| 2015/0191911 A1 * | 7/2015 | Mann | E04F 13/0805 | 52/475.1 |
| 2015/0282613 A1 * | 10/2015 | Chen | A47B 47/021 | 211/187 |

(56) References Cited

U.S. PATENT DOCUMENTS

| | | | |
|---|---|---|---|
| 2015/0322987 A1* | 11/2015 | Romano | H02G 3/0608 |
| | | | 248/49 |
| 2016/0122078 A1* | 5/2016 | Clark | B65D 85/06 |
| | | | 414/273 |
| 2016/0198851 A1* | 7/2016 | Werth | A45B 1/00 |
| | | | 211/18 |
| 2016/0251159 A1* | 9/2016 | Brumm | B65G 1/02 |
| | | | 29/525 |
| 2018/0140888 A1* | 5/2018 | Towley, III | A63B 21/075 |
| 2020/0026304 A1* | 1/2020 | Thode | G05D 1/0246 |

\* cited by examiner

STRUCTURE FOR AUTOMATED PALLET STORAGE AND RETRIEVAL

TECHNICAL FIELD

The present disclosure generally relates to pallet load storage structures having rails for automatic load transporting vehicles and specifically relates to beams and rails that improve the structural rigidity of pallet load storage structures.

BACKGROUND

Storage structures for automated warehouses are used to store palletized loads. The design of these storage structures is usually based on traditional, non-automated warehouse storage structures, but with rails added to enable the use of motorized load vehicles (e.g., carts). Thus, horizontal rails are typically added to horizontal beams that are supported by vertical columns. These horizontal rails may form aisles and rows within layered tiers of the structure. Elevators and motorized load vehicles may move loads throughout the aisles and rows to various storage positions in the structure. Aisles and rows may each support load vehicles having different characteristics, so aisle rails and row rails may each need to be installed in the structure to allow aisle carts and row carts to traverse their intended courses. The addition of robotic vehicle rails on top of the pallet shelving rack members is redundant for structural integrity and increases the labor needed for erection of the structure.

Traditional storage structures are also inherently laterally unstable. Diagonal struts between the horizontal members and vertical columns often must be added to provide rigidity against side impacts (e.g., from fork trucks), earthquakes, and other incidents. The diagonal supports increase the materials and labor expended to build and maintain the storage structure, thereby reducing the overall efficiency of the structure. Additionally, simply adding vehicle rails to a traditional storage structure may waste valuable space in the warehouse structure. There is therefore a need for improvements in storage structures for automated storage systems.

DISCLOSURE OF THE INVENTION

According to one aspect of the present disclosure, a multi-level rail for a storage structure is provided. The rail may comprise an upper horizontal portion configured to support a load, a lower horizontal portion configured to support a row vehicle, an upper support extending downward from the upper horizontal portion toward the lower horizontal portion, and a lower support extending downward from the lower horizontal portion. The rail may be configured to connect to at least one vertical post of the storage structure.

The upper horizontal portion may be narrower than the lower horizontal portion. At least one of the upper and lower supports may extend diagonally downward at an angle of about 25 degrees to about 55 degrees relative to the upper horizontal portion. A vertical portion may extend upward from the upper horizontal portion. Another vertical portion may extend between the upper and lower horizontal portions. Yet another vertical portion may extend downward from the lower horizontal portion. The upper and lower horizontal portions and the upper and lower supports may be portions of a single continuous rail body.

In some embodiments the upper horizontal portion and the upper support, or the lower horizontal portion and the lower support, form a right triangle with an axis perpendicular to the upper and lower horizontal portions. The upper and lower horizontal portions may be non-cantilever members.

In some arrangements the upper and lower supports extend downward diagonally from the upper and lower horizontal portions, respectively. The rail may further comprise an angled support surface extending upward from the upper horizontal portion. A beam bracket may be configured to connect to a horizontal beam.

The multi-level rail may comprise at least two separate pieces. One of the at least two separate pieces may comprise the upper horizontal portion and the upper support portion, and another of the at least two separate pieces may comprise the lower horizontal portion and the lower support portion. At least one of the at least two separate pieces may be connectable to a horizontal beam of the storage structure without connection to the vertical post of the storage structure.

In some embodiments the lower support portion may be configured to connect to a horizontal beam of the storage structure. The lower support portion may comprise a plurality of vertical portions reinforcing sides of the lower horizontal surface. The upper and lower horizontal portions may be part of an extruded shape. The rail may further comprise a platform portion extending horizontally away from the lower horizontal portion.

In another aspect of the disclosure, a storage support structure having row rails may be provided. The storage support structure may comprise a first column member, a second column member, a third column member, and a fourth column member. At least one horizontal support member may be attached to and extend between at least either the first and second column members or the third and fourth column members. A right rail may be attached to and extend horizontally between the first and third column members, and a left rail may be attached to and extend horizontally between the second and fourth column members. These right and left rails may each comprise an elongated continuous body including a load support surface extending horizontally from the column members and a row vehicle support surface extending horizontally from the column members below the load support surface. The first and second columns may be spaced apart sufficient for the load support surfaces to support a pallet load on the right and left rails and for the row vehicle support surfaces to support a row vehicle on the right and left rails.

The storage support structure may includes only horizontally extending support members extending between the column members. For example, no diagonal support members may be included between the columns and the horizontally extending support members. The left and right rails of the storage structure may each comprise at least one vertical portion, with the vertical portion of the right rails being attached to the first and third column members and the vertical portion of the left rail being attached to the second and fourth column members. In some embodiments the left and right rails may comprise at least one support portion configured to reinforce the load support surface or the row vehicle support surface from underneath the load support surface or the row vehicle support surface. The row vehicle support surface may extend farther toward an opposing column member than the load support surface.

Yet another aspect of the disclosure may relate to a torsion-reinforced beam for a storage support structure, wherein the beam may comprise an elongated body having a terminal end portion configured to attach to a vertical column of a storage support structure and having an upper support surface configured to support a horizontal support rail. A wing portion may be secured to the terminal end portion of the elongated body and configured to attach to the horizontal support rail by extending lateral to the elongated body and above the upper support surface.

In this torsion-reinforced beam, the wing portion may be attachable to a lateral side of the horizontal support rail. The wing portion may comprise at least two wing portions which may extend in different directions relative to the elongated body. These wing portions may extend from the elongated body at opposing ends of the elongated body.

The elongated body may comprise an I-beam, and the wing portion may comprise a web extending across flanges of the I-beam. This web may be C-shaped. The I-beam may comprise a vertical portion extending between the flanges, and the web is positioned farther from the vertical portion than the flanges of the I-beam. The web may comprise a cutoff portion adjacent to the terminal end portion of the elongated body. The cutoff portion may have a cutoff surface providing access to fasteners adjacent to a vertical column. The terminal end portion may attach to the vertical column using connectors, and the cutoff portion may expose or otherwise permit access to the connectors.

In another aspect of the disclosure, a method of reinforcing a storage support structure is provided. The method may comprise providing a plurality of vertical column members and attaching a plurality of horizontal support members to the vertical column members. The horizontal support members may have reinforcement flanges positioned adjacent to the vertical column members. The method may further comprise attaching a plurality of load support rails to the horizontal support members by connecting the reinforcement flanges to the load support rails, with the load support rails having a load support surface and a row vehicle support surface. Attachment between the reinforcement flanges and the plurality of load support rails may be configured to resist torsional movement of the horizontal support members.

The reinforcement flanges may be attached to the horizontal support members by welding. The reinforcement flanges may be attached to the plurality of load support rails in at least two positions. For example, the flanges may be attached once on each side of a horizontal support member.

Another aspect of the present disclosure relates to a method of erection of a storage structure. The method may comprise assembling a subassembly by orienting a plurality of column members horizontally, attaching a plurality of rail members to the plurality of column members, and attaching a plurality of beam members to the plurality of column members. Next, the subassembly may be turned to a vertical position such that the plurality of column members are oriented vertically and the plurality of rail members are oriented horizontally, and the subassembly may be secured in the vertical position.

In this method, the plurality of rail members may comprise a plurality of first rail portions and a plurality of second rail portions, wherein the first rail portions are attached to a first side of the subassembly, and the second rail portions are attached to a second side of the subassembly, with the second side being opposite the first side.

Securing the subassembly may comprise attaching the subassembly to another subassembly or to a ground surface. Securing the subassembly may also comprise attaching the plurality of rail members to vertical columns adjacent to the subassembly or attaching the plurality of rail members to rail members on vertical columns adjacent to the subassembly. At least one of the plurality of rail members and at least one of the rail members on the vertical columns adjacent to the subassembly may be paired parts of a multi-level rail assembly.

Individual beam members of the plurality of beam members may each comprise first and second ends. Attaching the plurality of beam members to the plurality of column members may thus comprise attaching column members at each end of the individual beam members.

Securing the subassembly in the vertical position may comprise attaching at least one of the plurality of column members of the subassembly to column members of an adjacent storage structure. Beam members of the plurality of beam members may comprise first and second ends, and attaching the plurality of beam members to the plurality of column members may comprise attaching a column member at only one end of the beam members.

Turning the subassembly may comprise tilting or tipping the subassembly into the vertical position. The method may also comprise attaching the plurality of rail members to the plurality of beam members.

The above summary is not intended to describe each embodiment or every implementation of embodiments of the present disclosure. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
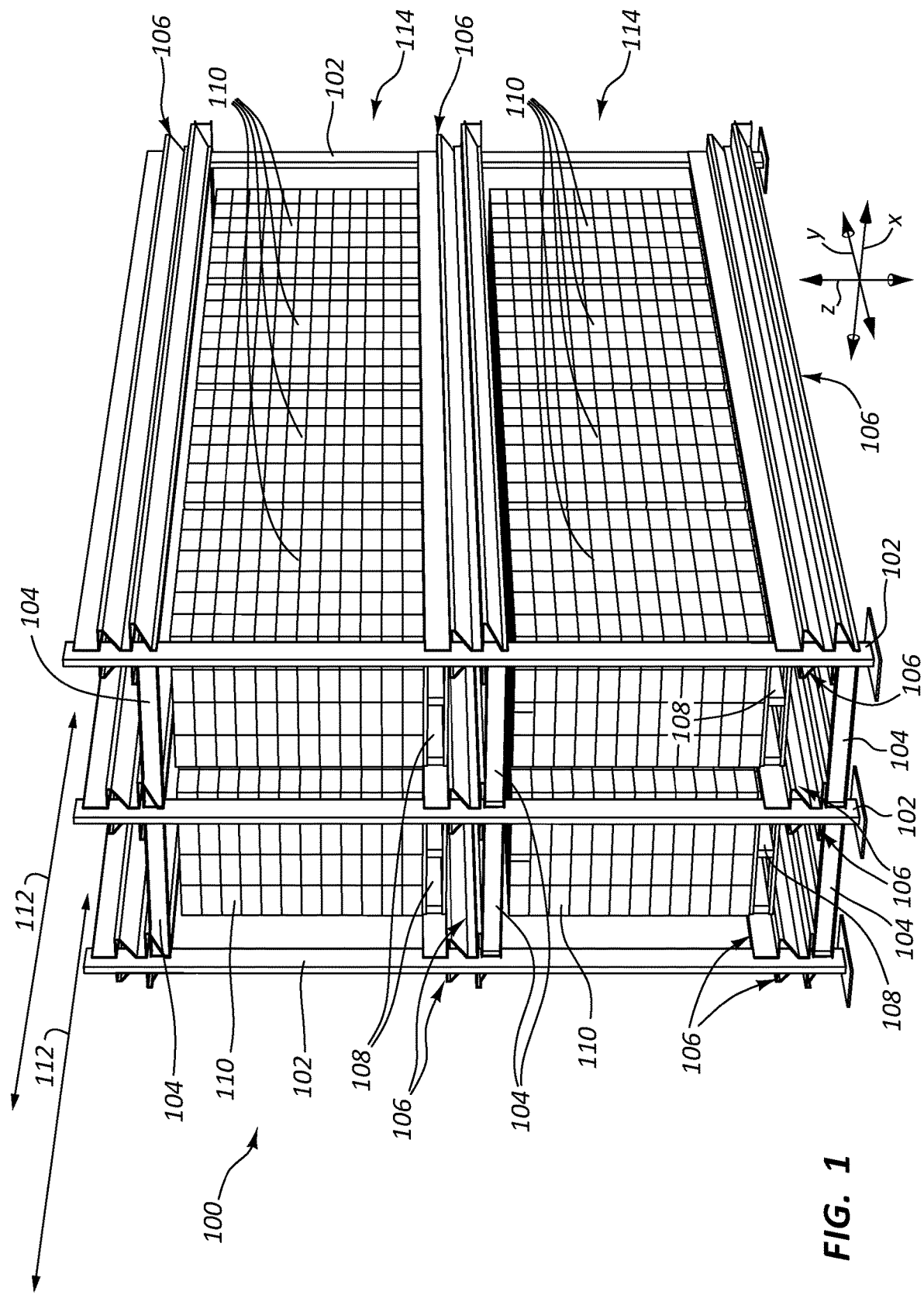
FIG. 1 is a perspective view of a storage structure according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

BEST MODE(S) FOR CARRYING OUT THE INVENTION

The present disclosure generally relates to a pallet storage support structure having multi-level or reinforced rails that may reduce or eliminate the need for diagonal cross bracing used to prevent structure collapse. The structure may include left- and right-oriented rails that hold pallets on a first tier of horizontal surfaces. A second tier of horizontal surfaces that provides a railway for automated load lifting vehicles (e.g., carts) may be positioned below the first tier on the rail. These tiers of horizontal surfaces may be attached to or integrated with vertical portions that are connected to the vertical columns of the structure. In this fashion, the rails may have multiple points of attachment to each vertical column while still providing a compact and resource-efficient load bearing surface that is traversable by automated vehicles.

In some embodiments, horizontal rail members in a structure may be strengthened by a flanged horizontal member. These flanges may include a welded channel that creates a reinforced closed shape that is better at resisting torsional stresses and deflection than typical horizontal beams (e.g., I-beams) when the beams are connected to robotic vehicle rails. Torsion transmitting plates or wings may extend from the flanges to connect to cross members or attach directly to vertical columns in the structure.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Referring now to the figures in detail, FIG. 1 shows a perspective view of a structure 100 for use in an automated storage facility. The structure 100 may comprise vertical columns 102 connected to each other by row spacing members 104 and rails 106. The rails 106 support pallets 108 on which loads 110 are stored. Vertical columns 102 may alternatively be referred to as vertical posts or pillars.

A structure 100 may be configured with a number of rows 112 which extend parallel to the rails 106. The rows 112 may be defined as extending in a Y direction and spaced apart in an X direction. The rows 112 may have multiple tiers 114 oriented vertically relative to each other, such as in a Z direction relative to each other. The vertical columns 102 separating the rows 112 may be spaced apart in the X direction so that the rails 106 are positioned to support opposite ends of the undersides of the pallets 108. Multiple pallets 108 may be placed consecutively along a row 112. The vertical columns 102 may be spaced apart sufficient for the load support surfaces to support a pallet load, or multiple pallet loads, on the row rails. Column spacing to support multiple (e.g., side-by-side) pallet loads may reduce the total number of columns and thereby reduce the overall cost of the structure 100.

In some embodiments, the structure 100 may also comprise aisles running horizontally perpendicular to the rows 112. For example, the aisles may extend along the X direction with aisle rails that allow an aisle vehicle to transport row vehicles to the rows 112. In some arrangements, elevator means may also be provided to transport vehicles vertically in the Z direction between tiers 114. Therefore, a palletized load 110 that is at ground level in the warehouse may be loaded onto a row vehicle which is carried by an aisle vehicle, transported to an elevator means, lifted by the elevator means to a destination aisle in a tier 114, moved by the aisle vehicle to a destination row 112, and moved to a resting place in the destination row 112 by a row vehicle. The reverse operation may be performed to remove or reposition the palletized load 110 from the structure 100.

The design of the structure 100 may support a compact storage system since only a small amount of space is needed between loads 110 in the X direction to accommodate the thickness of the vertical columns 102 and vertical portions of the rails 106. The space between loads 110 in the Z direction may also be minimized due to there being only a small amount of structure between tiers 114 in the form of the row spacing members 104 and lower portions of the rails 106. For example, space is saved because the rails 106 do not need to be mounted to redundant horizontal members.

While traditional rack structures are adjustable so that the distances between vertical columns and horizontal members can be adapted to many different sized loads, the structure 100 of the present disclosure may be specifically designed to fit a certain size or width of load since in an automated warehouse, row vehicles, aisle vehicles, pallets, and elevator means are usually only one universal size in each warehouse. Thus, the width between rails 106 may be consistent throughout the structure 100 to accommodate a single size of row vehicle and pallet 108. The adjustability of traditional storage rack structures allows single shelves or tiers of storage space to be adjusted if needed. This is beneficial when each position is loaded individually by a fork truck. However, in a structure for automated vehicles the elevation of all load pallet positions in a single level may beneficially be the same because non-uniform pallet positions may prevent automated access to all rails. Furthermore, converting a traditional storage structure to an automated storage structure is typically prohibitively expensive. Doing so requires converting rows that have various heights to have the same vertical positions, and this can only be done by great expenditure of labor and additional new rail-related materials. The conversion also eliminates the adjustability of the storage structure. In the end, any cost savings realized by the adjustability of the original installation are lost since future changes to the converted structure are not allowed. For these reasons, it may be beneficial to implement a storage structure of the present disclosure that eliminates adjustable tiers and superfluous support members in favor of a more minimal, yet structurally sound, storage facility that can still provide support for automated load-moving vehicles.

Figure 2:
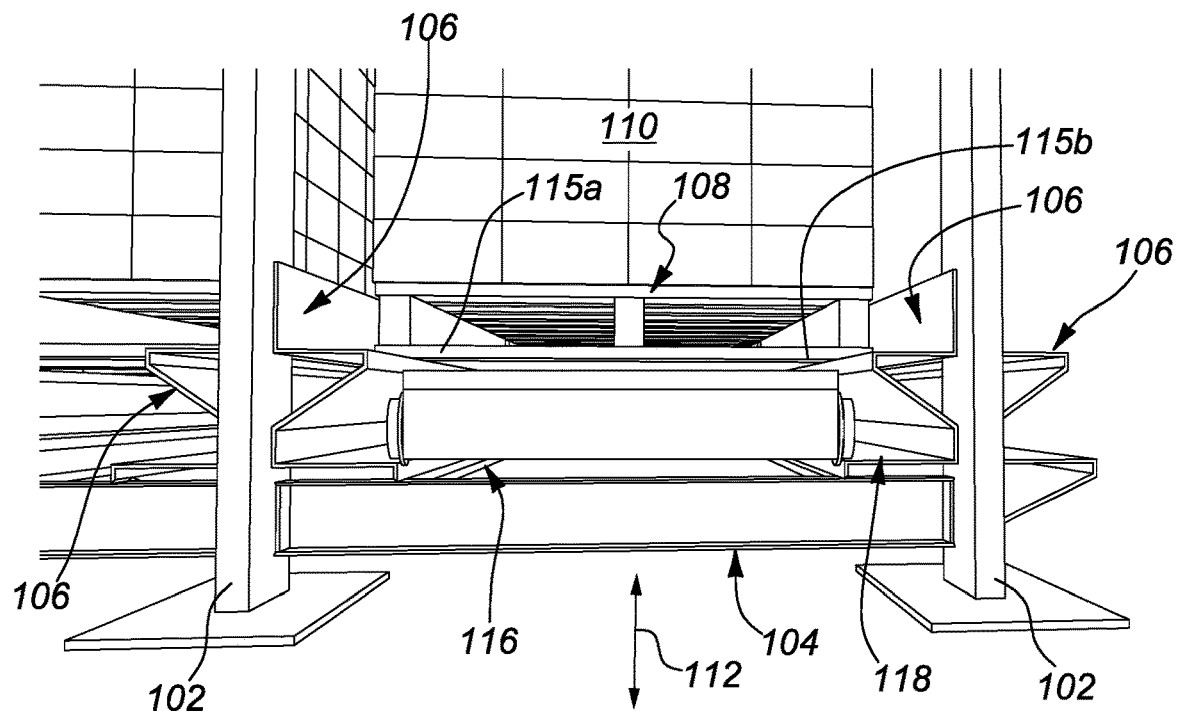
FIG. 2 is an end view of a row of the storage structure of FIG. 1.

FIG. 2 shows an end view of rails 106 attached to vertical columns 102 between row spacing members 104. This view shows the positioning of a pallet 108 relative to the rails 106 where the pallet 108 contacts the rails 106. A pallet 108 may have outer edges 115a, 115b in contact with the rails 106. The center of the row between the rails 106 may be open. This may allow a vehicle to traverse the row beneath the pallets 108 and to extend a lifting apparatus beneath a target pallet 108 to raise the pallet 108 from the rails 106 and move the pallet 108 on top of the lifting apparatus along the row.

Each row may comprise a left-side rail 116 and a right-side rail 118. The left and right directions may be defined relative to the view shown in this figure for convenience, but the left- and right-side rails 116, 118 may alternatively be referred to as first and second rails, respectively, or front and back rails, respectively. Thus, the terms left and right are only used herein for convenience in explaining the orientation of the rails 106 in the row 112. The rails 106 may alternatively be referred to as front and back rails since rails 106 are attached to opposing front and back sides of the vertical columns 102.

The left- and right-side rails 116, 118 may have mirrored shapes upon installation to vertical columns 102, with a left-side rail 116 facing away from the vertical column 102 to which it is attached toward the right, and a right-side rail 118 facing away from its vertical column 102 toward the left. Each rail 106, however, may be manufactured identically if the connection points for each rail are made interchangeable between left-side and right-side configurations since each rail 106 may be rotated laterally to change between left- and right-facing orientations.

Figure 3:
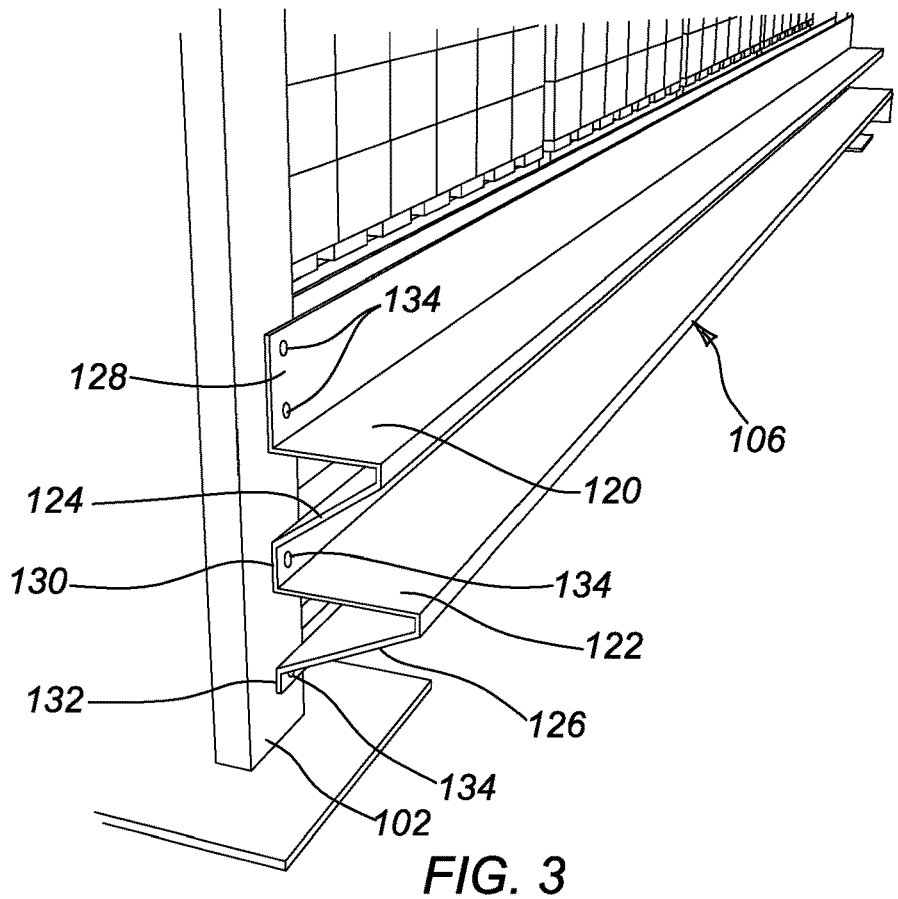
FIG. 3 is a perspective view of a rail attached to the storage structure of FIG. 1.

FIG. 3 shows a view of a rail 106 attached to a vertical column 102 without pallets 108 or loads 110 on the rail 106. The rail 106 has an upper horizontal portion 120 and a lower horizontal portion 122. An upper support portion 124 may extend downward from the upper horizontal portion 120 toward the lower horizontal portion 122. A lower support portion 126 may extend downward from the lower horizontal portion 122 to contact the vertical column 102. Thus, the rail 106 may be a single continuous rail body along each of the rail portions 120, 122, 124, 126. In some embodiments, the portions of the rail may be welded together or formed as one piece (e.g., rolled, extruded, bent, molded, or otherwise formed unitary). In other embodiments, the portions of the rail may be separate pieces connected to each other by fasteners (e.g., bolts, rivets, pins, and other comparable devices) or a bonding agent such as an adhesive.

The upper and lower horizontal portions 120, 122 may extend horizontally away from the vertical column 102 upon installation. The upper horizontal portion 120 may be configured to support an outer edge 115a, 115b of a pallet 108 without interfering with operation of a rail cart or row vehicle lifting apparatus that extends to contact the pallet 108 between upper horizontal portions 120 of left—and right-side rails 116, 118. The upper horizontal portion 120 may include a coating or cover to improve the durability of the surface against repeated loading from pallets 108.

The lower horizontal portion 122 may be configured to support wheels of a row vehicle that travels beneath pallets 108 along the row. Thus, the lower horizontal portion 122 may be spaced below the upper horizontal portion 120 at least at a distance equal to the height of a row vehicle. In some embodiments, the upper and lower horizontal portions 120, 122 may have different widths. For example, an upper horizontal portion 120 may be narrower than a lower horizontal portion 122. A narrower upper rail may allow a wider row vehicle to traverse the row, and a broader upper rail may allow a narrower pallet to be supported by the horizontal portions. Thus, the width of the horizontal portions may help accommodate different sizes of pallets and/or row vehicles.

In some arrangements, the horizontal portions 120, 122 may be referred to as extending toward an opposing vertical column 102 or column member. For example, a horizontal portion 120, 122 on a right-side rail 118 may extend toward a vertical column 102 attached to a left-side rail 116, wherein the left-side rail 116 opposes the right-side rail 118. The lower horizontal portion 122 may include a coating or cover to improve the durability of the surface against repeated traffic from row vehicles.

In some embodiments the upper and lower support portions 124, 126 may extend diagonally downward from the upper and lower horizontal portions 120, 122. Thus, the upper and lower support portions 124, 126 may form right triangles with the vertical column 102 and their respective upper and lower horizontal portions 120, 122. The included angle between one of the horizontal portions and its corresponding support portion may be between about 25 degrees and about 55 degrees. A 45 degree included angle may be beneficial in optimizing the strength of the support portion 124, 126 against the total height of the rail 106. The upper and lower support portions 124, 126 may also have shapes other than a straight angle relative to the upper and lower horizontal portions 120, 122. For example, the upper and lower support portions 124, 126 may have a curved sectional shape that curves from the edge of the upper and lower horizontal portions 120, 122 to the vertical column 102. The upper and lower support portions 124, 126 may be referred to as truss portions or reinforcement sections that cause the upper and lower horizontal portions 120, 122 to resist bending downward upon installation of the rail 106 to a vertical column 102. For at least this reason, the upper and lower horizontal portions 120, 122 may be referred to as non-cantilever members or portions of the rail 106. These "non-cantilever" or "non-freestanding" members have supports resisting bending rather than only being attached at the bases of the horizontal portions (i.e., as a cantilever member would be).

The upper and lower horizontal portions 120, 122 may be connected to vertical portions of the rail 106 which are connected to the vertical column 102. An upper vertical portion 128 may extend upward from the upper horizontal portion 120, a central vertical portion 130 may extend between the upper and lower horizontal portions 120, 122 or between the upper support portion 124 and the lower horizontal portion 122, and a lower vertical portion 132 may extend downward from the lower horizontal portion 122. These vertical portions 128, 130, 132 may be used to connect the rail 106 to the vertical column 102. For example, fasteners 134 may extend into the vertical column 102 through the rail 106 or the vertical portions 128, 130, 132 may be welded to or interlocked with the vertical column 102. In some embodiments, embossed hole reinforced fastener connections may be used to link the rail 106 to the vertical column 102. Such configurations may provide additional surface area to which a fastener may be attached to the rails.

In some embodiments, the number of vertical portions 128, 130, 132 may be less than three. For instance, an upper or lower vertical portion 128, 132 may be omitted entirely and the rail 106 may be attached to the vertical column 102 using only the central vertical portion 130. In another example, the upper vertical portion 128 may be the only vertical portion attached to the vertical column 102, and the other vertical portions 130, 132 may not be connected to the vertical column 102 or may be omitted. In some cases, the central vertical portion 130 may be omitted because the lower support portion 126 may extend directly between the upper horizontal portion 120 and the lower horizontal portion 122 without providing space for the central vertical portion 130.

The attachment between the rail 106 and the vertical column 102 using the vertical portions 128, 130, 132 may enable the storage structure to omit diagonal truss members that improve lateral stability. The rails 106 may be configured to be vertically tall enough that, upon attachment to the vertical column 102, they may have sufficient spacing between bolts or other fasteners relative to the vertical column 102 to prevent lateral motion of the storage structure, particularly as the number of rails 106 and vertical columns 102 increases in the structure. The row spacing members 104 may be used to provide this lateral stability in a direction perpendicular to the rails 106 (e.g., in the X direction shown in FIG. 1).

Left- and right-side rails 116, 118 may be attached to multiple vertical columns 102. For example, a left-side rail 116 may be attached to a first and a second vertical column and a right-side rail 118 may be attached to a third and a fourth vertical column (e.g., at the terminal end portions of the rail). If at least two fasteners 134 are used to link the rails 116, 118 to the vertical columns 102 then at least four attachment points may be defined for each rail 116, 118. These attachment points may reinforce each other against lateral movement or tilting of the storage structure 100.

Figure 4:
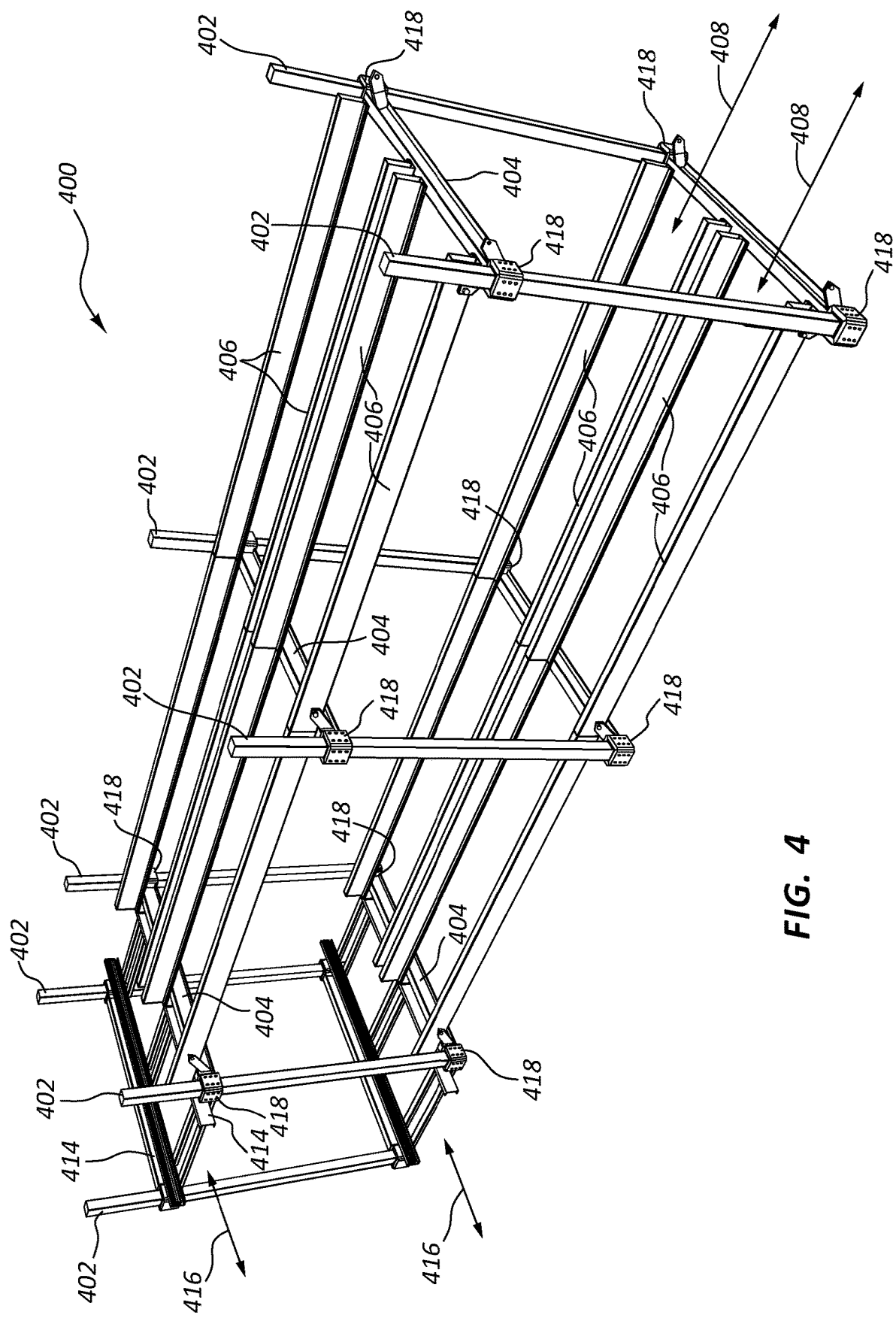
FIG. 4 is a perspective view of a storage structure according to another embodiment of the present disclosure.

FIGS. 4-8 illustrate another example embodiment of a storage structure 400 of the present disclosure that has torsion-reinforced beam members. The storage structure 400 may comprise vertical columns 402 connected to each other by horizontal beams 404. The horizontal beams 404 may support load-supporting rails 406 which are also horizontally oriented. A pair of load-supporting rails 406 may be positioned on each side of a row of the storage structure 400. In FIG. 4, four rows 408 are shown with two being positioned on an upper level 410 and two being positioned on a lower level 412. Aisle rails 414 may be attached to the vertical columns 402 to form upper and lower aisles 416 that run perpendicular to the rows 408.

Figure 5:
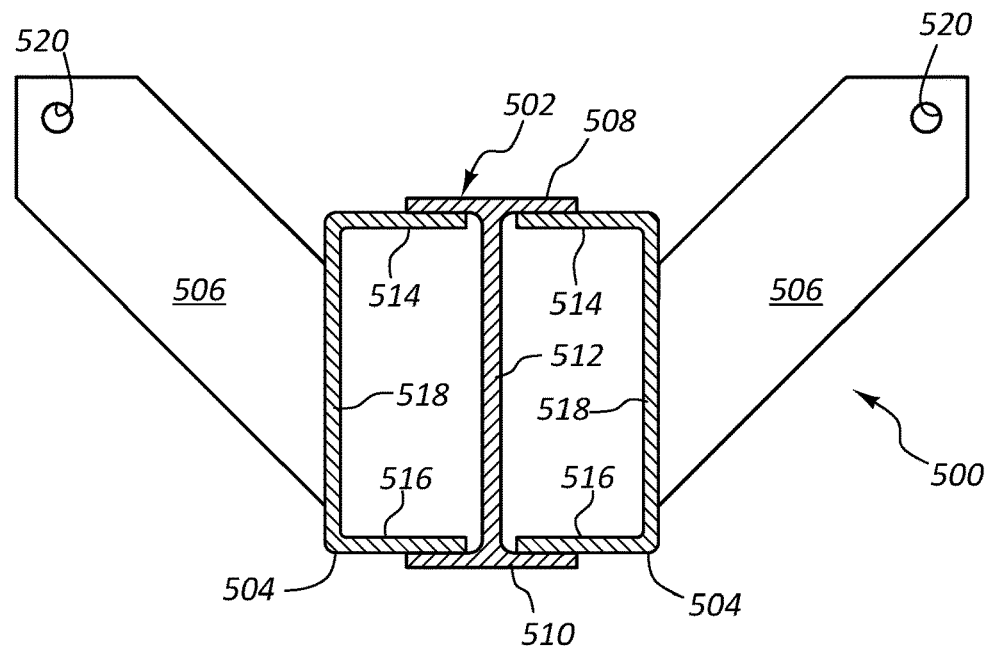
FIG. 5 is a sectional end view of a horizontal beam of the storage structure of FIG. 4.
Figure 6:
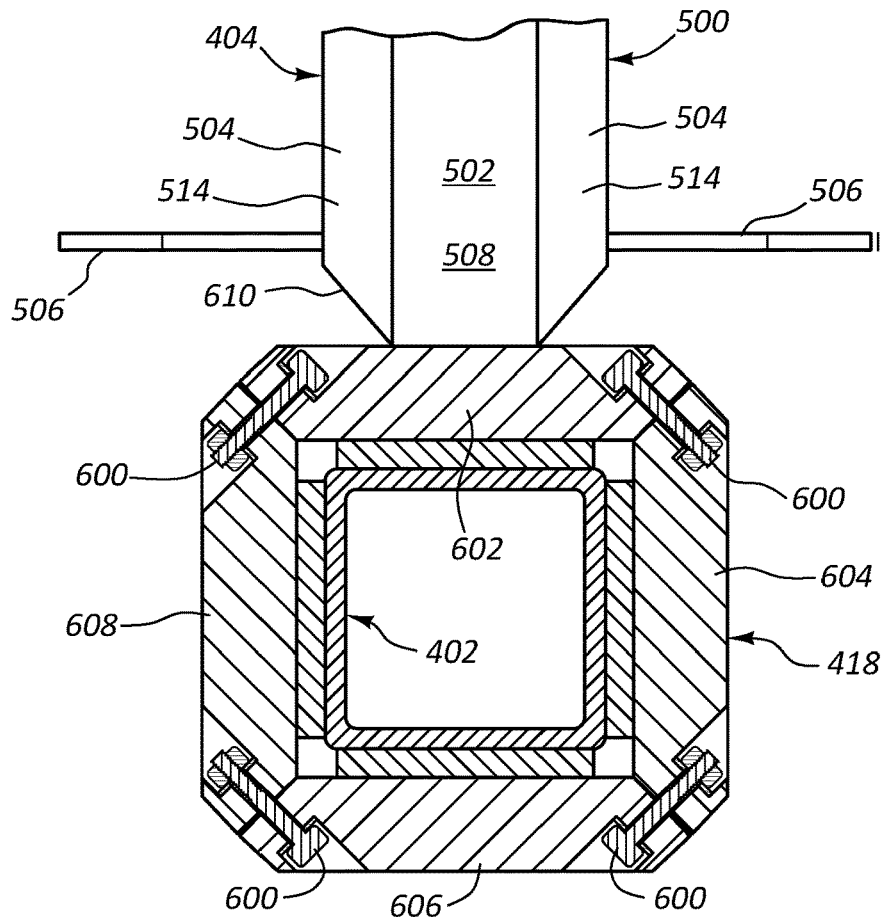
FIG. 6 is a sectional top view of a horizontal beam and vertical column of the storage structure of FIG. 4.

FIGS. 5-6 show detailed section views of a terminal end portion 500 of a horizontal beam 404 of the storage structure 400. FIG. 5 is a sectional end view and FIG. 6 is a sectional top view taken through a vertical column 402 at a bracket 418 linking the column 402 to the terminal end portion 500 of the horizontal beam 404. In some embodiments, the terminal end portion 500 may be welded to the bracket 418. In other embodiments, the terminal end portion 500 may be attached to the bracket 418 using clips, pins, bolts, interlocking parts, or other fastening devices.

The terminal end portion 500 of the horizontal beam 404 may comprise an I-beam 502 centrally positioned between two web portions 504. The web portions 504 may be attached laterally to the I-beam 502. Each of the web portions 504 may have a wing portion 506 extending upwardly and laterally toward a load-supporting rail 406 supported by the horizontal beam 404. See also FIGS. 7-8. These web portions 504 may be referred to as reinforcement flanges of the horizontal beam 404.

The I-beam 502 may have an upper flange 508 and a lower flange 510 connected to a central flange 512. An I-beam 502 may be beneficially used in a horizontal beam 404 due to its resistance to bending. Thus, an I-beam 502 may support heavy loads that rest on the load-supporting rails 406 on the horizontal beam 404.

The I-beam 502 may be reinforced against torsion by the web portions 504 and wing portions 506. These web and wing portions 504, 506 may collectively be referred to as channel portions or torsion transmitting plates. The web portions 504 may link the upper and lower flanges 508, 510 and link them to the wing portions 506. The wing portions 506 may be bolted or otherwise fastened or attached to a load-supporting rail 406. Therefore, torsion applied to the terminal end portion 500 may be transmitted through the wing portions 506 to additional points of contact with the load-supporting rail 406 (e.g., in addition to contact or attachment of the upper flange 508 to the bottom of the rail 406), and the points of contact with the load supporting rail 406 are farther spaced apart from a longitudinal axis of the I-beam 502 (e.g., running along the central flange 512 through vertical columns 402). The addition of the channel-like web portions 504 also creates a closed shape that is much better at resisting torsional stresses and deflection than a normal I-beam. Thus, horizontal forces applied to the storage structure 400 may cause less torsional deflection of the beams 404, and the structure 400 may be more rigid in that direction without a need for diagonal cross-braces or other superfluous structural elements.

The web portions 504 may be welded, fastened (e.g., using bolts or rivets), bonded, or otherwise attached to the upper and lower flanges 508, 510 of the I-beam 502. The web portions 504 may therefore include an upper section 514 and lower section 516 connected to respective flanges of the I-beam 502 and a central section 518 linking the upper and lower sections 514, 516. For this reason, the web portions 504 may be referred to as having a "C" shape or "U" shape. The upper and lower sections 514, 516 of the web portions 504 may be attached to opposing inner surfaces of the I-beam 502, and in other embodiments, the upper and lower sections 514, 516 may be attached to opposing outer surfaces of the I-beam 502. In some embodiments, the web portions 504 may be flat plates attached to the sides of the central flange 512 of the I-beam 502 or to side edges of the upper and lower flanges 508, 510, provided that the attachment to these areas provides sufficient structural integrity to improve the torsional stiffness of that portion of the I-beam 502.

The web portions 504 may extend partially along the longitudinal axis of the I-beam 502 near the terminal end portion 500 of the I-beam 502 to reduce weight. See, e.g., FIG. 7. For example, the web portions 504 may only be needed where the horizontal beam 404 is attached to the load-supporting rail 406. In some embodiments, the web portions 504 may extend along the entire length of the I-beam 502.

The wing portions 506 may extend diagonally away from the web portions 504 to abut and attach to load-supporting rails 406. The wings may therefore be said to extend in in different directions relative to the elongated body of the horizontal beam 404 since one wing portion extends toward a left side and one extends toward a right side, even though both extend upward. In some embodiments, the structure of the wing portions 506 may not be diagonal, but may have another shape that may reach up to a load-supporting rail 406 such as an upward curve or a right angle. A diagonal shape may reduce materials needed to position bolt holes 520 on the wing portions 506 and may beneficially resist bending while transferring rotational forces between the horizontal beam 404 and load-supporting rail 406. Bolts 522 may be placed through the bolt holes 520 to keep the rail 406 connected to the beam 404. In some embodiments, the wing portions 506 may extend to a lateral side of the load-supporting rail 406 (e.g., surface 524 in FIG. 7). Some arrangements may additionally or alternatively attach the wing portions 506 to a bottom surface of the rail 406. Wing portions 506 may be only attached to rails 406 that are adjacent to vertical columns 402, as shown in FIG. 4, or the wing portions 506 may be attached to internal rails of the rows 408 of the storage structure 400.

In some configurations, multiple wing portions 506 may be implemented on each side of the horizontal beam 404. The wing portions 506 may extend from the elongated body of the horizontal beam 404 at opposing ends of the beam 404, such as at each terminal end portion of the beam 404, or from each lateral side of the beam 404. Wing portions 506 may be referred to as reinforcement flanges that are attachable to load-supporting rails in at least two positions. For example, the wing portions 506 may be attached to apertures in the load-supporting rail 406 that are configured to receive bolts in more than one position along the length of the rail 406 so that the wing portions 506 may be attached centrally, at an end portion, or elsewhere on the rail 406.

Figure 7:
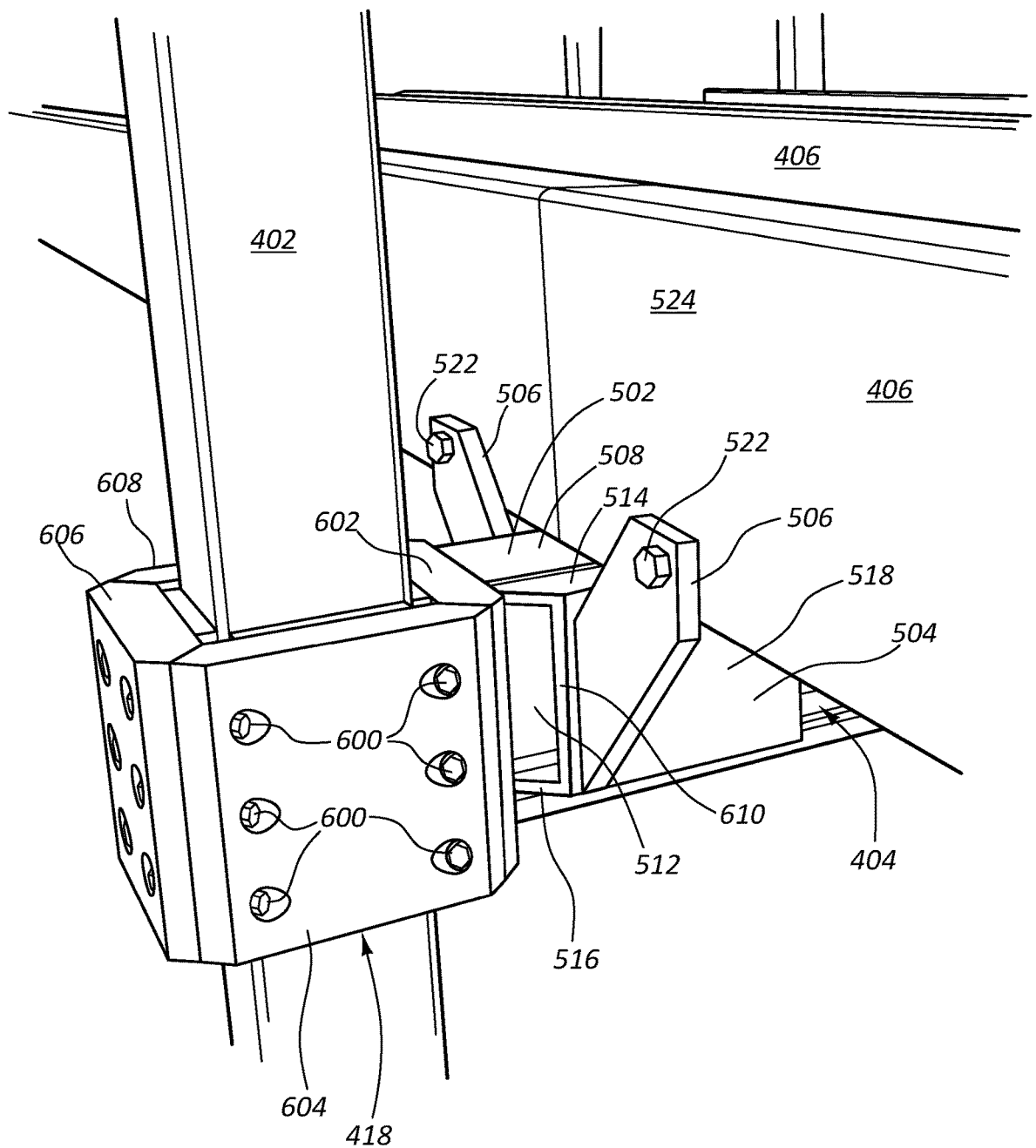
FIG. 7 is a perspective view of an interface between a horizontal beam and a vertical column of the storage structure of FIG. 4.

The horizontal beams 404 may be attached to the vertical columns 402 by brackets 418. The brackets 418 may be attached to the horizontal beams 404 to improve the speed of attaching and detaching the horizontal beams 404 to and from the vertical columns 402. FIGS. 6-7 show views of the interface between a bracket 418, a vertical column 402, a horizontal beam 404, and a load-supporting rail 406. The bracket 418 may comprise bolts 600 extending diagonally through the corners of the bracket 418 that tighten the side portions 602, 604, 606, 608 of the bracket 418 in place relative to the vertical column 402. These diagonal bolts 600 may be fasteners or connectors. The web portions 504 of the horizontal beams 404 may therefore have cutout surfaces 610 leaving space between the bolts 600 adjacent to the side portion 602 facing the horizontal beam 404 and the web portion 504 for easier access during installation and maintenance. As shown in FIGS. 6-7, the cutout surfaces 610 are cut at about 45 degrees from an axis running perpendicular to the longitudinal axis of the horizontal beam 404. The cutout surfaces 610 may alternatively be referred to as cutoff surfaces or cutoff portions of the web portion 504 since the web portion 504 is cutoff from reaching the vertical column 402, even if the method of manufacture of the web portion 504 does not necessarily include cutting off the web portion 504 (e.g., with a saw or grinder).

Figure 8:
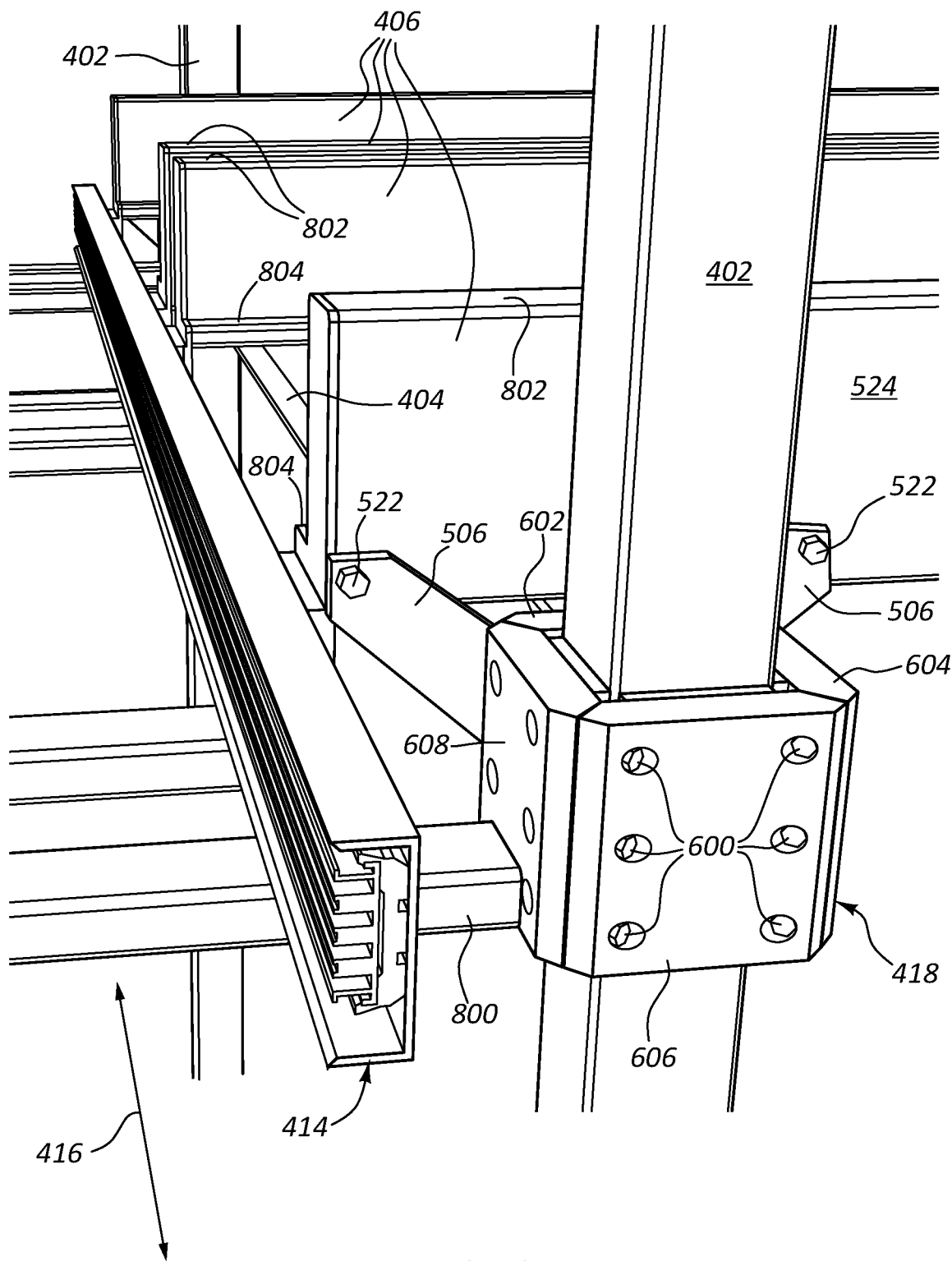
FIG. 8 is another perspective view of an interface between a horizontal beam, a vertical column, and an aisle of the storage structure of FIG. 4.

FIG. 8 shows a detailed view of an intersection of a vertical column 402, a horizontal beam 404, load-supporting rails 406, and aisle rails 414 near an aisle 416 in the storage structure 400. In typical automated warehouses, storage structures have rails for aisles and rows added to a traditional storage rack structure to convert the traditional rack structure into an automated-vehicle-capable structure. This usually means that the positions of the aisles and rows are not perfectly aligned in three dimensions, since traditional storage structures may have various sizes and position of horizontal and vertical beams. An automated warehouse must have precisely aligned rails for both the aisles and rows so that aisle vehicles and row vehicles may travel smoothly and without major discontinuity in the rail systems. The adjustability of traditional structures works against this goal in many situations, since the adjustability may be too small. Consequently, for example, an aisle rail and a row rail may only be able to be positioned relative to each other at 4-inch increments, or the adjustability may be too large, wherein positioning rails relative to each other at a desired position may be possible, but may also be time-consuming and labor-intensive to achieve.

As illustrated in FIG. 8, the present storage structure 400 may address these issues by providing a system in which the load-supporting row rails 406 may be reliably positioned relative to the aisle rails 414 because they are both linked to a bracket 418 on the same vertical column 402. Also, the row rails 406 and aisle rail 414 may be connected to each other by a bracket attached to the end of each row rail 406. This bracket may help to directly coordinate and synchronize row and aisle rail deflections so that the row vehicle never has to climb a step created by unequal deflections between the rails. The web and wing portions 504, 506 of the horizontal beams 404 may keep the load-supporting rails 406 held in a desired horizontal position relative to the horizontal beams 404 and relative to the adjacent aisle rail 414, and the vertical position of the rails 406, 414 may be secured by their mutual connection to the bracket 418. At least one horizontal aisle beam 800 may be used for the purpose of linking the aisle rails 414 to the bracket 418.

FIG. 8 also shows that the load-supporting rails 406 may have a load supporting surface 802 positioned vertically higher than a row-vehicle-supporting surface 804. A palletized load may rest on the load supporting surface 802, and the row-vehicle-supporting surface 804 may support the row vehicle as it moves along a row.

Various embodiments herein may be implemented by a method of reinforcing a storage support structure. The method may comprise providing a plurality of vertical column members (e.g., vertical columns 102, 402) and attaching a plurality of horizontal support members to the vertical column members (e.g., horizontal beams 404). The horizontal support members may have reinforcement flanges positioned adjacent to the vertical column members. These flanges may comprise, for example, web portions 504 and wing portions 506. The method may further include attaching a plurality of load support rails to the horizontal support members by connecting the reinforcement flanges to the load support rails. For instance, the wing portions 506 may be attached to the load support rails. These load support rails may have a load support surface and a row vehicle support surface.

FIGS. 9-12 show additional embodiments of row rails that may be implemented in a storage structure (e.g., storage structure 100). Some row rails may comprise a plurality of pieces or sections that are connected to vertical columns or other members of the storage structure to allow the row rails to be installed with differing heights, widths between rails, or angles of their support surfaces. Some rails may have surfaces configured to align or orient loads, pallets, vehicles, and other elements of the system.

Figure 9:
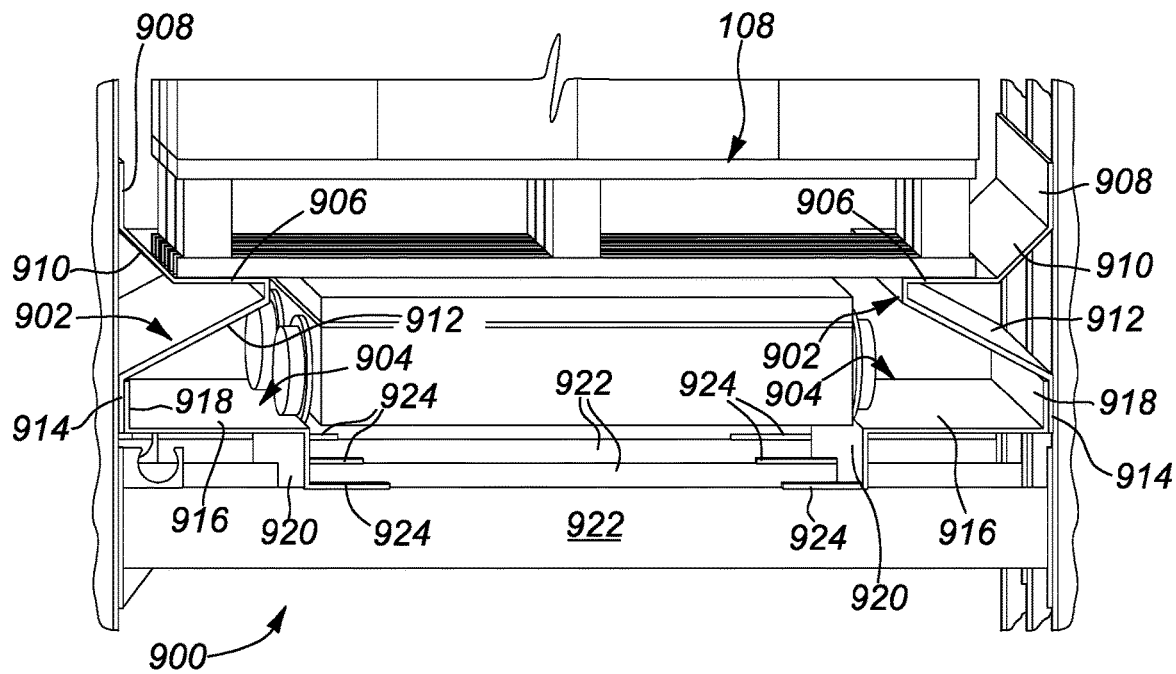
FIG. 9 is an end view of another example embodiment of a row rail of the present disclosure.

FIG. 9 shows an end view of a two-piece row rail system 900. A two-piece design may simplify manufacturing and/or installation of the rail system 900. A first rail portion 902 (i.e., first piece) may be positioned above a second rail portion 904 (i.e., second piece) on each side of a row. The first rail portion 902 may comprise a horizontal surface 906 that is connected to a vertical attachment surface 908 with an angled support surface 910 between the horizontal surface 906 and the vertical attachment surface 908. A support portion 912 may extend downward from the horizontal surface 906 similar to upper support portion 124 extending from upper horizontal portion 120. A second vertical attachment surface 914 may extend from the support portion 912. The vertical attachment surfaces 908, 914 may allow the first rail portion 902 to be attached to a vertical column of the support structure.

The angled support surface 910 of the first rail portion 902 may help orient a pallet 108 between vertical columns on top of the horizontal surfaces 906 of rails on each side of a row. When a load is placed on the rail portion 902 off-center, the outer edge of the pallet 108 may contact the angled support surface 910 and therefore slide toward the center of the row until the pallet 108 rests completely on the horizontal surface 906 of each of the first rail portions 902. The load will also be righted by the angled support surface if the pallet 108 is rotated and not square with the length of the row when it is placed on the first rail portions 902. Thus, if a load is skewed or twists during movement through the structure system, the angled support surface 910 may beneficially reorient the pallet 108 to a desired centered and squared position. This may improve the ability of the storage system to accurately track the position of the load and to reliably find and lift the load in its proper orientation.

The second rail portion 904 may be positioned generally vertically below the upper rail portion 902. The second rail portion 904 may be integrated with and made as a single piece with the first rail portion 902 in some embodiments, but, as shown in FIG. 9, the second rail portion 904 may also be a separate piece. The second rail portion 904 may comprise a horizontal surface 916 that is connected to vertical portions 918, 920. Vertical portion 918 may be configured to attach to a vertical column or may attach to a vertical portion 914 of the first rail portion 902. Vertical portion 920 may extend downward from the horizontal surface 916 to increase the rigidity of the horizontal surface 916.

Vertical portion 920 may also connect to a horizontal beam 922 extending across the row using a beam bracket 924. A beam bracket 924 may help align the positions of the second rail portions 904 on each side of a row so that each second rail portion 904 is longitudinally positioned at the same location relative to the vertical columns and horizontal beams 922.

The horizontal surface 916 may preferably be configured and positioned to support a row vehicle that may travel below the first rail portion 902 to lift and move loads that rest on the horizontal surface 906 of the first rail portion 902. Having the second rail portion 904 separate from the first rail portion 902 may allow the vertical distance between the horizontal portion 906 on the first rail portion 902 to be adjusted based on the shape of the surrounding storage structure or the row vehicle being used with the storage structure.

The embodiment of FIG. 9 may also be beneficial because if the first and second rail portions 902, 904 are connected to each other, their combined structure provides an interlink between vertical columns and the horizontal beams 922 of the storage structure. This may further enhance the lateral stability and rigidity of the structure over embodiments such as the rails in FIG. 1.

Figure 10:
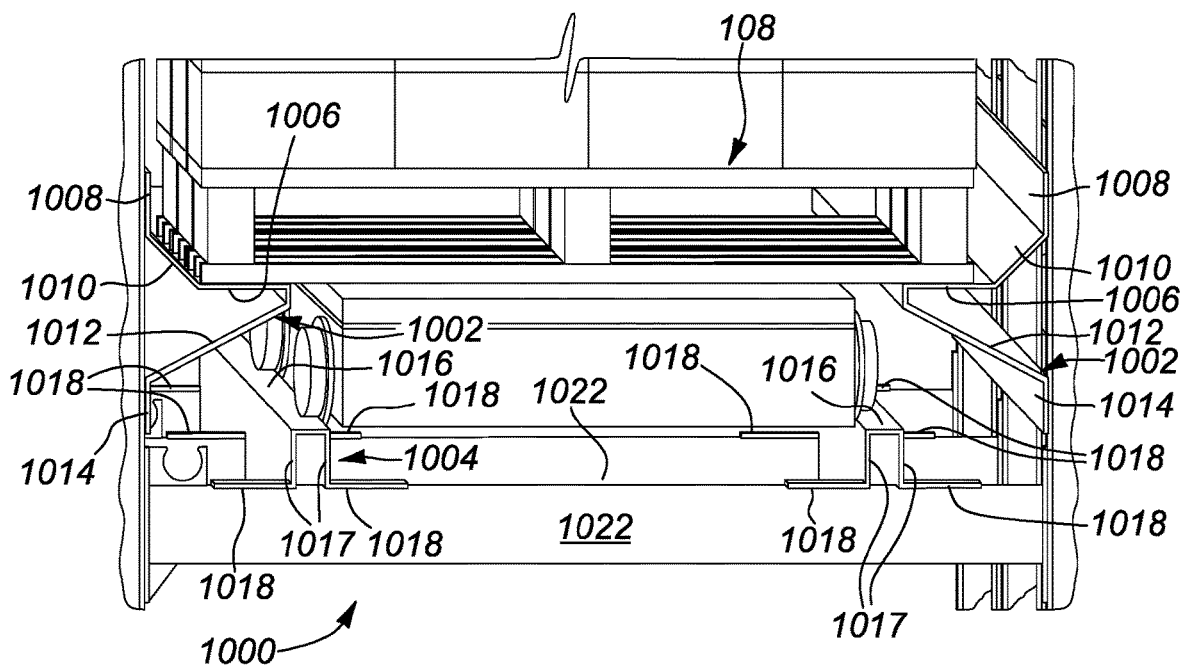
FIG. 10 is an end view of another example embodiment of a row rail of the present disclosure.

FIG. 10 is another embodiment of a two-piece row rail system 1000. A first rail portion 1002 may be positioned above a second rail portion 1004 on each side of a row. The first rail portion 1002 may comprise a horizontal surface 1006 that is connected to a vertical attachment surface 1008 with an angled support surface 1010 between the horizontal surface 1006 and the vertical attachment surface 1008. A support portion 1012 may extend downward from the horizontal surface 1006 similar to upper support portion 124 extending from upper horizontal portion 120. A second vertical attachment surface 1014 may extend from the support portion 1012. The vertical attachment surfaces 1008, 1014 may allow the first rail portion 1002 to be attached to a vertical column of the support structure. In some embodiments, the first rail portion 1002 may be the same as first rail portion 902.

The second rail portion 1004 may extend beneath the first rail portions 1002 on each side of the row. The second rail portion 1004 may comprise a horizontal surface 1016 that is positioned vertically higher than the level of horizontal beams 1022 of the storage structure. The horizontal surface 1016 may be used to support a row vehicle as it moves through the row. Vertical portions 1017 may connect the horizontal surface 1016 to bracket flanges 1018 configured to connect to the horizontal beams 1022 of the structure. The bracket flanges 1018 may help secure the second rail portions 1004 to the horizontal beams 1022 and secure the longitudinal position of the second rail portions 1004 in the row.

The separate rail portions 1002, 1004 may be simple to install in a storage structure. The horizontal surfaces 1016 may also be more rigid and resistant to bending than the horizontal surfaces 916 of FIG. 9 due to the vertical portions 1017 reinforcing each side of the horizontal surfaces 1016 against bending and twisting.

Figure 11:
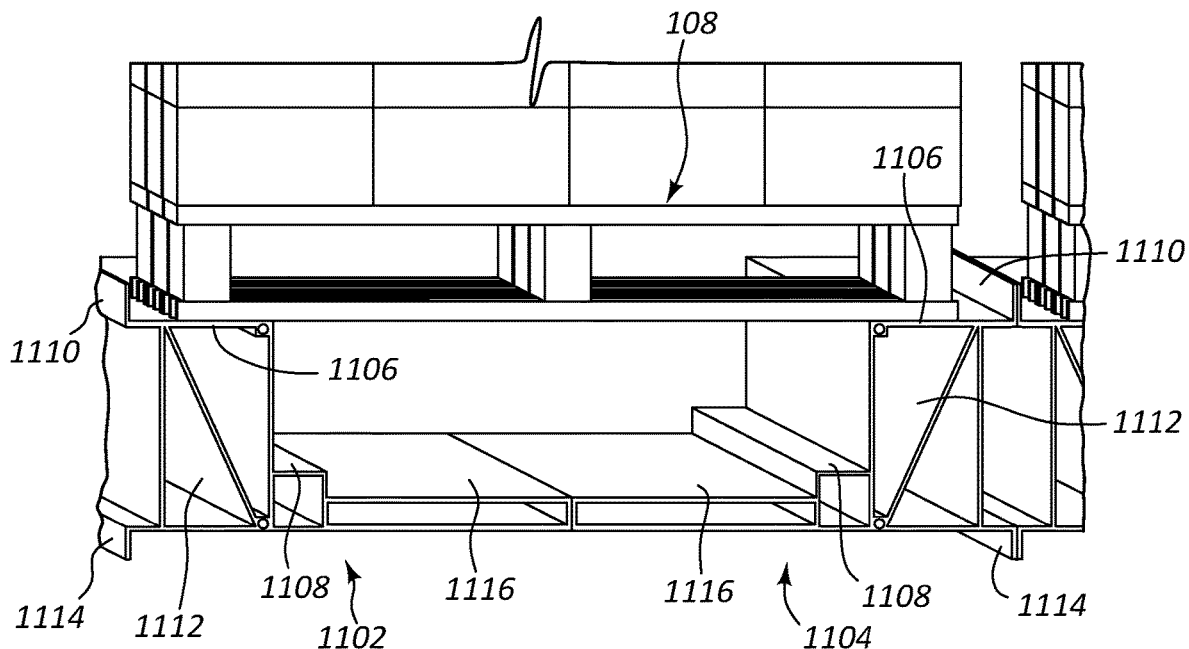
FIG. 11 is an end view of another example embodiment of a row rail of the present disclosure.

FIG. 11 shows an end view of another row rail system 1100 having multiple horizontal support surfaces. The rail system 1100 may be extruded to simplify manufacturing and assembly and to improve rigidity. The rail system 1100 may comprise a left-side rail 1102 and a right-side rail 1104 each having an extruded shape configured to be respectively attached to left and right sides of the row. The extruded shape may make it possible to form each of the left-side and right-side rails 1102, 1104 with an integral single-piece construction. In one example, the rails 1102, 1104 are formed from extruded aluminum or other extrudable and/or formable material. A rail 1102, 1104 may comprise an upper horizontal surface 1106 and a lower horizontal surface 1108. The upper horizontal surface 1106 may be configured to support a load, such as a loaded pallet 108.

A vertical portion 1110 may extend upward from the upper horizontal surface 1106 to facilitate connection of the extruded rail to a vertical column. A triangular support structure 1112 may be positioned below the upper horizontal surface 1106 to reinforce the upper horizontal surface 1106 against bending and twisting. Below the triangular support structure 1112 another vertical portion 1114 may extend into contact with a vertical column for attachment of the rail to the column.

A platform 1116 may extend horizontally away from the lower horizontal surface 1108 and the triangular support structure 1112. In some configurations the platform 1116 may extend into contact with a platform 1116 of another rail. For example, respective platforms 1116 of the left and right side rails 1102, 1104 may extend into contact with each other. The platforms 1116 may also be attached to each other. The platform 1116 portion of the rail may be beneficial as a shelf that prevents items from falling through the support structure between the vertical columns. The platforms 1116 may also act as an additional support surface for a row cart traveling through the row. The vertical thickness of the platforms 1116 may help prevent bending of the rail as a whole when the platforms 1116 of adjacent rails are connected to each other. The platform 1116 may also be connected to a horizontal beam extending across the row to further improve rigidity of the storage structure.

Figure 12:
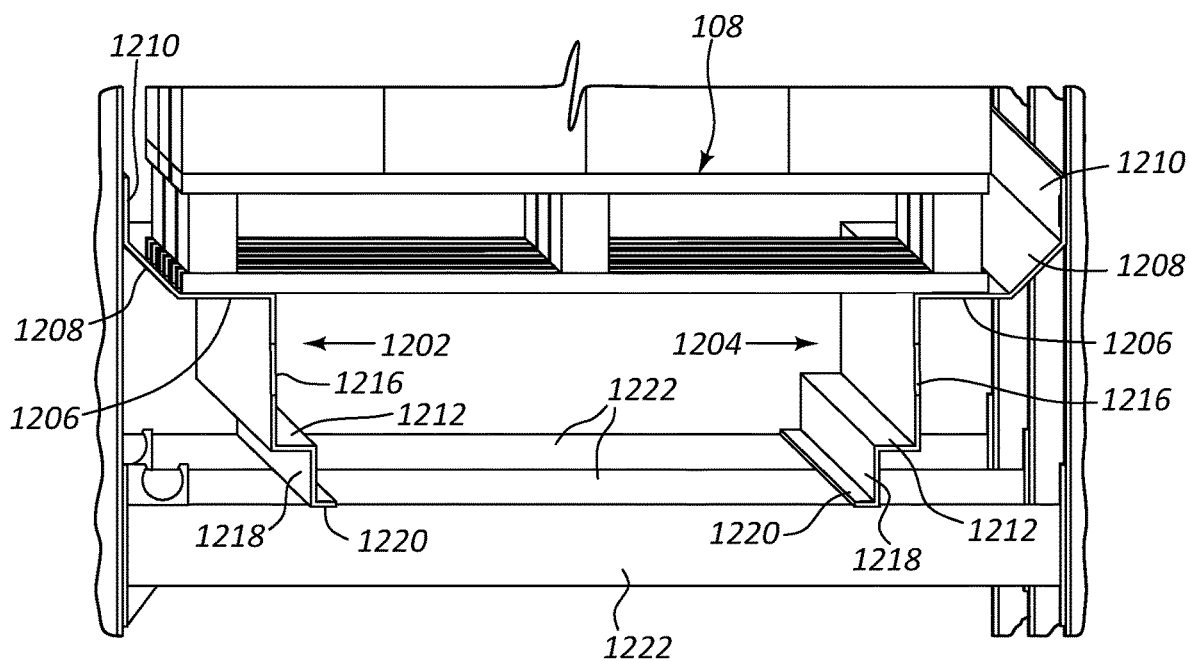
FIG. 12 is an end view of another example embodiment of a row rail of the present disclosure.

FIG. 12 shows yet another embodiment of a rail system 1200 that may be implemented in a storage structure. In this rail system 1200, a left side rail 1202 and a right side rail 1204 are positioned on opposite sides of a row. The left and right side rails 1202, 1204 may have upper horizontal surfaces 1206 linked to sloped support surfaces 1208 and vertical surfaces 1210. The sloped support surfaces 1208 and vertical surfaces 1210 may function similar to the angled support surfaces 910 and vertical attachment surfaces 908 of the rails of FIG. 9. Lower horizontal surfaces 1212 may be positioned below the upper horizontal surfaces 1206, linked by support surfaces 1216. The lower horizontal surfaces 1212 may be connected to horizontal beams 1222 using vertical portions 1218 and beam brackets 1220.

These rails 1202, 1204 may also allow for other components or systems to be installed underneath or around the rails. For example, piping, wiring, or tubing may be installed underneath the upper horizontal surface 1206 of the left side rail 1202. This system 1200 may also be beneficial because it provides a link between the vertical support columns and the horizontal beams 1222 of the structure that may further increase rigidity of the overall structure.

While a specific configuration is shown in FIG. 12, it will be understood that left and right side rails 1202, 1204 may be configured with different dimensions, and widths depending on the needs of the user. Thus, it will be apparent to those having ordinary skill in the art that this example embodiment may be configured and modified as necessary to provide rail features customized in many ways.

In some embodiments, aspects of systems of the present disclosure may be implemented using methods of manufacturing. Some methods of manufacturing a storage structure may include positioning vertical columns and horizontal beams to form a grid-like matrix of supports extending vertically and horizontally in a location. Row rails may be attached to the vertical columns and extend between the vertical columns perpendicular to the horizontal beams and extending along rows formed by the vertical columns. Aisles may also be formed at the ends of the rows.

Figure 13A:
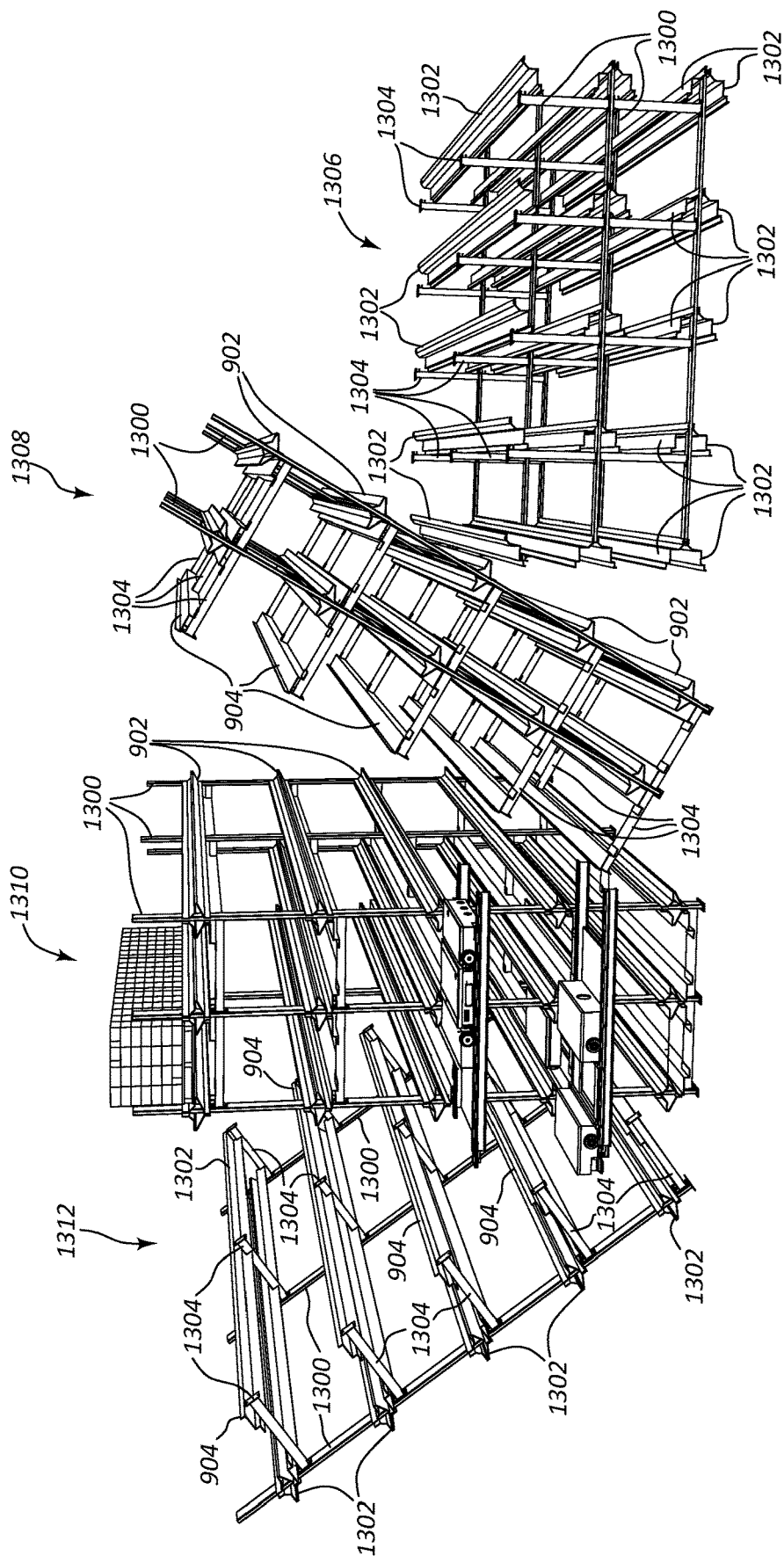
FIG. 13A is a view of a tip-up erection method of constructing a storage structure according to an embodiment of the present disclosure.
Figure 13B:
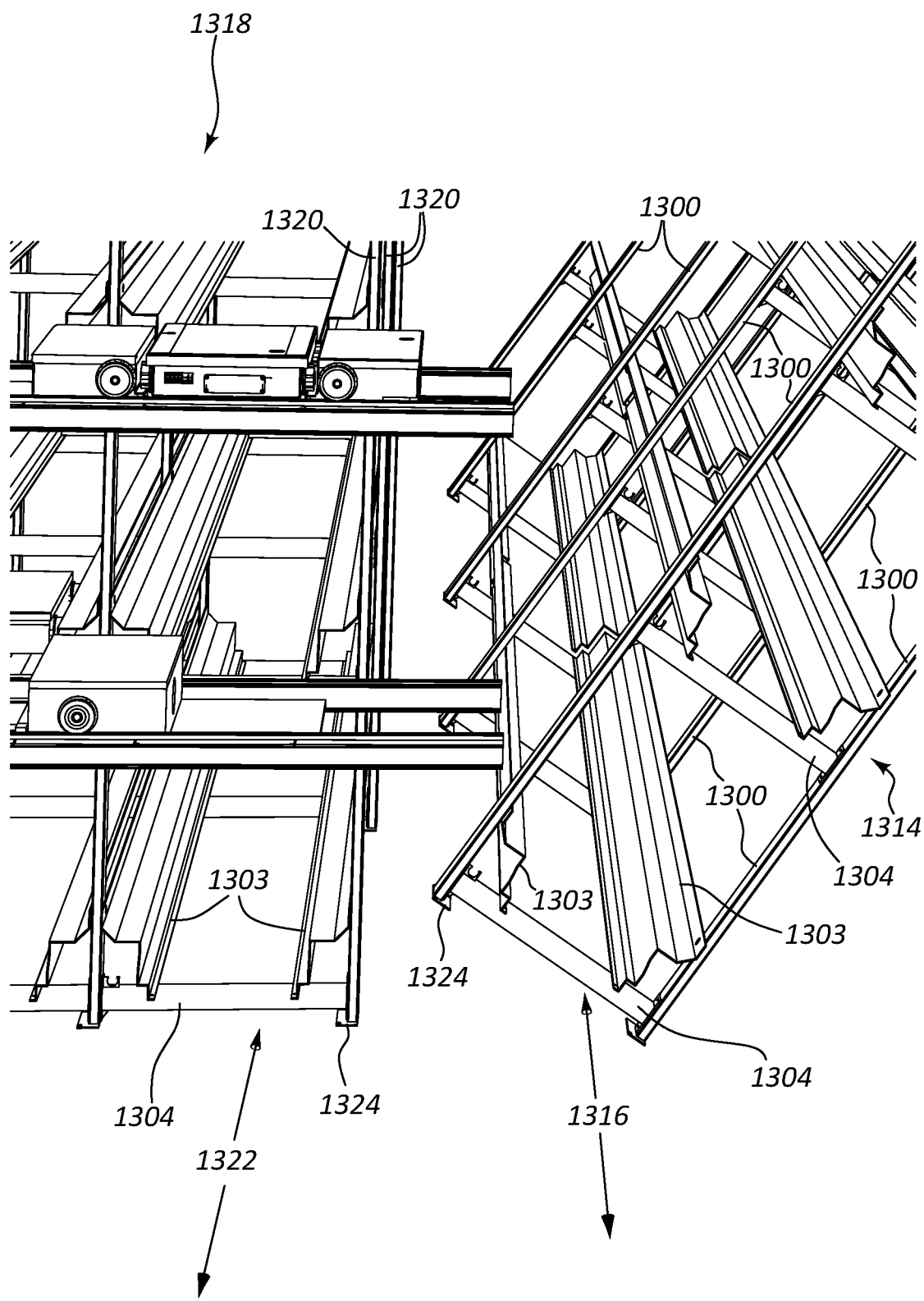
FIG. 13B shows a detail view of a tip-up erection method of constructing a storage structure with doubled vertical columns.

In some cases, it may be beneficial to construct a storage structure using a tip-up erection process, as illustrated in FIGS. 13A-13B, wherein structures may be assembled at a ground level in a horizontal position and then tipped or lifted into a vertical position where they are secured in place to the ground or to adjacent vertically-positioned structural elements.

Row rails may be designed to facilitate this method of erection. For example, the row rails of the embodiment shown in FIG. 13A are two-piece rails having the features of the rail portions 902, 904 of FIG. 9. When portions of the storage structure are erected, vertical columns 1300 may be arranged horizontally and row rails 1302 may be attached to the vertical columns 1300 (e.g., by attaching vertical portions of the row rails 1302 to the vertical columns 1300). The row rails 1302 may be attached perpendicular to the vertical columns 1300 and/or parallel to the ground. In some embodiments, horizontal beams 1304 may also be assembled to the vertical columns 1300, and a tiered structure 1306 (i.e., a subassembly structure) may be thus created near ground level. The horizontal beams 1304 may be attached perpendicular to the vertical columns 1300, such as by being attached in a vertical position relative to the columns 1300. In some configurations, the row rails 1302 may also be attached to the horizontal beams 1304.

In some methods, vertical columns 1300 may not be attached to one side of a row in the tiered structure 1306 before it is raised into the vertical position. For example, on tiered structure 1308 in FIG. 13A, vertical columns 1300 are not installed on the left side. Once the tiered structure 1308 is lifted or turned upward to a vertical position, the tiered structure 1308 may be attached to the vertical columns 1300 of an already-vertical part of the structure (e.g., the vertical columns 1300 of another tiered structure 1310) or to a ground surface.

The outer sides of the tiered structures 1306, 1308 that are lifted into vertical positioned may use two-piece split rails 1302. Thus, only half of each of the two-piece rails 1302 may be connected to each side of the tiered structures 1306, 1308 before they are lifted into place. For example, in FIG. 13A, the right side of a vertical column 1300 in tiered structure 1308 only has a first rail portion (e.g., 902) attached to the vertical column 1300 before it is repositioned vertically. The left side of the tiered structure 1308 only has a second rail portion (e.g., 904) extending across the horizontal beams 1304. When the tiered structure 1308 is tilted into the vertical position, the second rail portions 904 may be linked to or otherwise paired with first rail portions 902 that are on an adjacent structure 1310. Thus, the first and second rail portions 902, 904 on the tiered structures 1308, 1310 may be referred to as paired parts of a multi-level rail assembly, and the positioning of the second rail portions 904 near the first rail portions 902 may allow the rail portions 902, 904 next to each other on the tiered structures 1308, 1310 to be used as a multi-level rail for the row (e.g., as the rails described in connection with FIG. 9).

A split rail configuration may improve rigidity of the tiered structure 1306 as it is tilted into its vertical operating position. The left and right sides of the tiered structure 1308 may be connected to rail portions 902, 904 before the tiered structure 1308 is moved, so horizontal beams 1304 of a lifted structure (e.g., 1308) may be easier to position next to horizontal beams 1304 of an adjacent structure (e.g., 1310). If rail portions 904 are attached to rail portions 902 on tiered structure 1308, free ends of the horizontal beams 1304 on the left side of the tiered structure 1308 may not be linked to each other while the structure 1308 is raised. This may make the structure 1308 more likely to need repositioning once the structure 1308 is raised, particularly if only one set of vertical columns 1300 is part of the tiered structure 1308 (e.g., as in tiered structure 1312).

Still referring to FIG. 13A, a horizontal tiered structure 1306 may be tipped upward to reach the vertical position, as shown by tiered structure 1308 which is shown in a diagonal position between horizontal and vertical positions. At its final position, the structure 1306 may have vertically-oriented vertical columns 1300, as exemplified by tiered structure 1310. In some cases, row rails 1302 may be attached to already-vertically oriented vertical columns 1300. For example, row rails 1302 on tiered structure 1308 may be attached to vertical columns 1300 on tiered structure 1310 when tiered structure 1308 is in its final vertical position next to tiered structure 1310.

The tip-up method of construction may decrease assembly time and complexity for a tall storage structure since many of the connections between structural rails and columns may be more conveniently made at ground level before the tiered structure 1306 is tipped upward. Thus, the number of assembly actions that must be performed high in the structure may be reduced.

By assembling a tiered structure 1306 at ground level with at least one row having vertical columns on each side, the tiered structure 1306 may have structural stiffness while it is still on the ground. This stiffness of the structure may ensure that there is limited bending or warping of columns or rails as the tiered structures 1306, 1308 are tipped up into their final resting positions. Stresses on the bolts, welds, or other connections between structural elements may also be more evenly distributed.

In some embodiments, however, vertical columns of only one side of a rail row may be assembled at ground level and then may be tipped up to connect to other portions of the overall storage structure. For example, FIG. 13A shows a tiered structure 1312 that only has one set of vertical columns 1300 that is being tipped up to connect to the rest of the storage structure. For at least these reasons, the structure constructed at ground level may comprise one or more preassembled vertical tiers and at least one side of one or more preassembled rows of rails.

In some embodiments, a single-piece rail may be used in this construction method. The single piece of the rail may be attached to either the vertical columns 1300 or to the ends of the horizontal beams 1304. The user may determine whether the vertical columns 1300 or the horizontal beams 1304 are a preferable connection point based on which position is most likely to provide structural rigidity of the tiered structure 1306 as it is moved into the vertical position. For example, FIG. 13B shows an embodiment of a tiered structure 1314 with single-piece rails 1303 being constructed using tip-up erection.

FIG. 13B shows another embodiment of a tip-up erection method wherein a subassembly 1314 may be assembled at ground level with vertical columns 1300 on each side of a row 1316. The subassembly 1314 may be tipped up into position to be bolted or otherwise attached to other subassemblies 1318 or nearby structures. In this view, the subassembly 1314 is shown in the process of being tilted into place and has nearly reached its vertical position after being tilted from a horizontal position.

Once in the vertical position, the vertical columns 1300 of the subassembly 1314 may be attached to vertical columns 1320 of other subassemblies 1318 or nearby structures in adjacent pairs. Thus, vertical columns 1300 of a row of one subassembly 1314 may be directly attached to vertical columns 1320 of an adjacent row 1322. The vertical columns 1300, 1320 may abut each other or may be connected by brackets, welding, or other means for attachment known in the art.

The bases 1324 of the vertical columns 1300, 1320 may be configured to facilitate adjacent placement of multiple vertical columns. As shown in FIG. 13B, the bases 1324 of the vertical columns 1300, 1320 extend inward toward the rows 1316, 1322 without also extending away from the rows 1316, 1322 so that the vertical columns 1300, 1320 may be positioned close to each other while still allowing the bases 1324 to be bolted down to the ground.

By pairing vertical columns 1300, 1320 in this manner, the storage structure may be more simply assembled. Each row 1316, 1322 may be separately assembled and then moved together to form the combined assembly. Also, during the individual assembly each row 1316, 1322 may be more structurally stable due to each row 1316, 1322 having vertical columns 1300, 1320 on each side of the row 1316, 1322. After a subassembly is complete, individual rows 1316, 1322 may be repositioned separate from each other if necessary as well.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A combination of a storage support structure and a row vehicle, the storage support structure comprising:
a plurality of vertical posts;
a left multi-level rail system and a right multi-level rail system each comprising:
an upper horizontal portion configured to support a load;
a lower horizontal portion below the upper horizontal portion,
the lower horizontal portion supporting the row vehicle;
an upper support extending diagonally downward from the upper horizontal portion;
a lower support extending downward from the lower horizontal portion; and
a vertical portion extending upward from the upper horizontal portion, wherein the vertical portion, the upper support, and the upper horizontal portion form a continuous structure;
wherein for each of the left and the right multi-level rail systems the upper horizontal portion and the lower horizontal portion are positioned so that the row vehicle may place the load on the upper horizontal portion to be supported by the upper horizontal portion and lift said load from the upper horizontal portion,
wherein for each of the left and the right multi-level rail systems the vertical portion of the rail system is connected to at least one vertical post of the plurality of vertical posts of the storage support structure; and
the row vehicle having left wheels atop the lower horizontal portion of the left multi-level rail system and right wheels atop the lower horizontal portion of the right multi-level rail system.

2. The combination of claim 1, wherein for each of the left and the right multi-level rail system the upper horizontal portion is narrower than the lower horizontal portion.

3. The combination of claim 1, wherein for each of the left and the right multi-level rail systems the upper support extends diagonally downward at an angle of about 25 degrees to about 55 degrees relative to the upper horizontal portion.

4. The combination of claim 1, wherein the left and the right multi-level rail systems each further comprise a second vertical portion extending between the upper horizontal portion and the lower horizontal portion.

5. The combination of claim 1, wherein for each of the left and the right multi-level rail systems the upper and lower horizontal portions and the upper and lower supports are portions of a single continuous rail body.

6. The combination of claim 1, wherein for each of the left and the right multi-level rail systems the upper and lower horizontal portions are non-cantilever members.

7. The combination of claim 1, each of the left and the right multi-level rail systems further comprising an angled support surface extending upward from the upper horizontal portion.

8. The combination of claim 1, each of the left and the right multilevel rail systems further comprises a beam bracket configured to connect to a horizontal beam of the storage structure.

9. The combination of claim 1, wherein each of the left and the right multi-level rail systems are at least two separate pieces.

10. The combination of claim 9, wherein for each of the left and the right multi-level rail systems one of the at least two separate pieces comprises the upper horizontal portion, the upper support, and the vertical portion and another of the at least two separate pieces comprises the lower horizontal portion and the lower support.

11. The combination of claim 1, wherein for each of the left and the right multi-level rail systems the lower support is configured to connect to a horizontal beam of the storage structure.

12. The combination of claim 1, wherein for each of the left and the right multi-level rail systems the lower support comprises a plurality of vertical portions reinforcing sides of the lower horizontal portion.

13. A combination of a storage support structure and a row vehicle, the storage support structure comprising:
- a plurality of multi-level rail systems, each multi-level rail system comprising: an upper horizontal portion configured to support a load;
- a lower horizontal portion that supports the row vehicle; an upper support extending diagonally downward from the upper horizontal portion toward the lower horizontal portion;
- a lower support extending downward from the lower horizontal portion; and
- at least two separate pieces, wherein a first continuous piece of the at least two separate pieces includes the upper horizontal portion and the upper support, wherein a second continuous piece of the at least two separate pieces includes the lower horizontal portion and the lower support;
- a first column member, a second column member, a third column member, and a fourth column member;
- at least one horizontal support member attached to and extending between at least either the first and second column members or the third and fourth column members; wherein a corresponding right multi-level rail system from said plurality of multi-level rail systems comprises a corresponding first piece and a corresponding second piece, the corresponding first piece includes a respective upper horizontal portion and is attached to and extends horizontally between the first and third column members and the corresponding second piece includes a respective lower horizontal portion and is attached to the at least one horizontal support member; wherein a corresponding left multi-level rail system from said plurality of multi-level rail systems comprises a corresponding third piece and a corresponding fourth piece, the corresponding third piece includes a respective upper horizontal portion and is attached to and extends horizontally between the second and fourth column members and the corresponding fourth piece includes a respective lower horizontal portion and is attached to the at least one horizontal support member;
- and the row vehicle having left wheels atop the lower horizontal portion of the left multi-level rail system and right wheels atop the lower horizontal portion of the right multi-level rail system.

14. A combination of a storage support structure and a row vehicle, the storage support structure comprising:
- a plurality of multi-level rail systems, each multi-level rail system comprising: an upper horizontal portion configured to support a load;
- a lower horizontal portion that supports the row vehicle; an upper support extending downward from the upper horizontal portion toward the lower horizontal portion; and
- a lower support extending downward from the lower horizontal portion; and wherein at least one of the upper and lower supports extends diagonally downward at an angle of about 25 degrees to about 55 degrees relative to the upper horizontal portion;
- a first column member, a second column member, a third column member, and a fourth column member;
- at least one horizontal support member attached to and extending between at least either the first and second column members or the third and fourth column members; wherein a corresponding right multi-level rail system from said plurality of multi-level rail systems comprises a corresponding first piece and a corresponding second piece, the corresponding first piece includes a respective upper horizontal portion and is attached to and extends horizontally between the first and third column members and the corresponding second piece includes a respective lower horizontal portion and is attached to the at least one horizontal support member; wherein a corresponding left multi-level rail system from said plurality of multi-level rail systems comprises a corresponding third piece and a corresponding fourth piece, the corresponding third piece includes a respective upper horizontal portion and is attached to and extends horizontally between the second and fourth column members and the corresponding fourth piece includes a respective lower horizontal portion and is attached to the at least one horizontal support member;
- and the row vehicle having left wheels atop the lower horizontal portion of the left multi-level rail system and right wheels atop the lower horizontal portion of the right multi-level rail system.

15. The combination of claim 14 wherein an upper gap between the upper horizontal portion of the left multi-level rail system and the upper horizontal portion of the right multi-level rail system is wider than a lower gap between the lower horizontal portion of the left multi-level rail system and the lower horizontal portion of the right multi-level rail system.

16. The combination of claim 14 wherein for each of the right and left multi-rail systems: the lower support comprises a pair of vertical portions that connect the lower horizontal portion to the at least one horizontal support member.

* * * * *